(12) United States Patent
Chun

(10) Patent No.: US 11,240,737 B2
(45) Date of Patent: Feb. 1, 2022

(54) METHOD FOR ACCESSING NETWORK IN WIRELESS COMMUNICATION SYSTEM AND APPARATUS THEREFOR

(71) Applicant: LG ELECTRONICS INC., Seoul (KR)

(72) Inventor: Sungduck Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 22 days.

(21) Appl. No.: 16/643,990

(22) PCT Filed: Dec. 26, 2018

(86) PCT No.: PCT/KR2018/016640
§ 371 (c)(1),
(2) Date: Mar. 3, 2020

(87) PCT Pub. No.: WO2019/132501
PCT Pub. Date: Jul. 4, 2019

(65) Prior Publication Data
US 2021/0068036 A1 Mar. 4, 2021

Related U.S. Application Data

(60) Provisional application No. 62/610,947, filed on Dec. 28, 2017.

(30) Foreign Application Priority Data

Jun. 25, 2018 (KR) .................. 10-2018-0073017

(51) Int. Cl.
*H04W 48/08* (2009.01)
*H04W 48/06* (2009.01)
*H04W 74/08* (2009.01)

(52) U.S. Cl.
CPC .......... *H04W 48/08* (2013.01); *H04W 48/06* (2013.01); *H04W 74/0833* (2013.01)

(58) Field of Classification Search
None
See application file for complete search history.

(56) References Cited

U.S. PATENT DOCUMENTS

| 2008/0130588 A1* | 6/2008 | Jeong | ............... H04W 48/10 370/335 |
|---|---|---|---|
| 2015/0215843 A1 | 7/2015 | Lee et al. | |

(Continued)

FOREIGN PATENT DOCUMENTS

| CN | 101938704 | 1/2011 |
|---|---|---|
| CN | 105612788 | 5/2016 |

(Continued)

OTHER PUBLICATIONS

Extended European Search Report in European Appln. No. 18895348.3, dated Aug. 16, 2021, 11 pages.
Office Action in Chinese Appln. No. 201880066369.9, dated Aug. 16, 2021, 12 pages (with English translation).

*Primary Examiner* — Hong S Cho
(74) *Attorney, Agent, or Firm* — Fish & Richardson P.C.

(57) ABSTRACT

Disclosed are a method of accessing a network in a wireless communication system and an apparatus therefor. Specifically, a method of accessing a network by a user equipment (UE) in a wireless communication system may include receiving, from the network, a skip condition for an access barring check operation for a cell supported by a base station, determining whether the UE satisfies the skip condition for the access barring check operation, determining that access to the network on the cell has not been barred when the skip condition for the access barring check opera- (Continued)

tion is satisfied, and performing the access to the network on the cell without performing the access barring check operation.

10 Claims, 8 Drawing Sheets

(56) References Cited

U.S. PATENT DOCUMENTS

| | | | |
|---|---|---|---|
| 2016/0157290 A1* | 6/2016 | Lee | H04W 76/27 |
| | | | 370/329 |
| 2016/0219493 A1* | 7/2016 | Kim | H04W 4/60 |
| 2016/0381623 A1 | 12/2016 | Lee et al. | |
| 2017/0041854 A1 | 2/2017 | Kim et al. | |
| 2017/0201939 A1 | 7/2017 | Lee et al. | |
| 2017/0359706 A1 | 12/2017 | Pinheiro et al. | |
| 2018/0020382 A1* | 1/2018 | Kim | H04W 48/02 |

FOREIGN PATENT DOCUMENTS

| | | |
|---|---|---|
| CN | 106471848 | 3/2017 |
| CN | 107087442 | 8/2017 |
| EP | 3096560 | 11/2017 |
| WO | WO2016006948 | 1/2016 |
| WO | WO2016048431 | 3/2016 |
| WO | WO2016204985 | 12/2016 |

* cited by examiner (a) Control plane protocol stack (b) User plane protocol stack

METHOD FOR ACCESSING NETWORK IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/016640, filed on Dec. 26, 2018, which claims the benefit of U.S. Provisional Application No. 62/610947, filed on Dec. 28, 2017, and Korean Patent Application No. 10-2018-0073017, filed on Jun. 25, 2018. The contents of the prior applications are all hereby incorporated by reference herein in their entirety.

TECHNICAL FIELD

The present invention relates to a wireless communication system and, more particularly, to a method of accessing a network by a user equipment (UE) and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The present invention proposes a method of controlling access to a network by a UE in a wireless communication system.

Furthermore, the present invention proposes a method of controlling access to a network by a UE supporting a plurality of different radio access methods in a wireless communication system.

Furthermore, the present invention proposes a method of controlling access to a network by a UE supporting frequency bands having different characteristics in a wireless communication system.

The technical objects of the present invention are not limited to the aforementioned technical objects, and other technical objects, which are not mentioned above, will be apparently appreciated by a person having ordinary skill in the art from the following description.

Technical Solution

In an aspect, a method of accessing a network by a user equipment (UE) in a wireless communication system may include receiving, from the network, a skip condition for an access barring check operation for a cell supported by a base station, determining whether the UE satisfies the skip condition for the access barring check operation, determining that access to the network on the cell has not been barred when the skip condition for the access barring check operation is satisfied, and performing the access to the network on the cell without performing the access barring check operation.

In another aspect, a user equipment (UE) performing access to a network in a wireless communication system may include a transceiver configured to transmit and receive radio signals and a processor configured to control the transceiver. The processor may be configured to receive, from the network, a skip condition for an access barring check operation for a cell supported by a base station, determine whether the UE satisfies the skip condition for the access barring check operation, determine that access to the network on the cell has not been barred when the skip condition for the access barring check operation is satisfied, and perform the access to the network on the cell without performing the access barring check operation.

Preferably, the skip condition for the access barring check operation may include one or more of the support of E-UTRA-NR dual connectivity (ENDC), the support of multi-RAT dual connectivity (MRDC), the support of licensed assisted access (LAA), the support of an LTE-WLAN aggregation (LWA) or the support of a new RAT (NR).

Preferably, the skip condition for the access barring check operation may further include frequency information to which the skip condition for the access barring check operation is applied.

Preferably, the access barring check operation may include one or more of access control barring (ACB), extended access barring (EAB), or application specific congestion control for data communication (ACDC).

Preferably, when a plurality of the access barring check operations is used, a skip condition for the access barring check operation may be transmitted for each access barring check operation.

Preferably, a radio resource control (RRC) message transmitted to perform the access to the network may include information on an access barring check operation skipped by the UE and/or information on a skip condition for an access barring check operation satisfied by the UE.

Preferably, a random access preamble resource for performing the access to the network may be allocated to a UE satisfying a skip condition for a specific access barring check operation.

Preferably, when the UE satisfies the skip condition for the specific access barring check operation, the UE may transmit, on the allocated random access preamble resource, a random access preamble for performing the access to the network.

Preferably, information on whether the skip of the access barring check operation is allowed may be received from the network.

Preferably, the information on whether the skip of the access barring check operation may be allowed indicates that the skip of what access barring check operation is allowed based on data to be transmitted by the UE.

Preferably, when the skip of the access barring check operation is allowed based on the data to be transmitted by the UE, whether the UE satisfies the skip condition for the access barring check operation may be determined.

Advantageous Effects

According to an embodiment of the present invention, access to a radio network by a UE in the congestion situation of radio resources can be effectively controlled.

Furthermore, according to an embodiment of the present invention, although the congestion situation of radio resources occurs, an access opportunity for a network can be provided to a UE by effectively controlling access to a radio network by the UE supporting a plurality of different radio access methods.

Furthermore, according to an embodiment of the present invention, an access opportunity for a network can be provided to a UE by effectively controlling access to a radio network by the UE supporting frequency bands having different characteristics.

Effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompanying drawings, included as part of the detailed description in order to help understanding of the present invention, provide embodiments of the present invention and describe the technical characteristics of the present invention along with the detailed description.

BEST MODE FOR INVENTION

Figure 1:
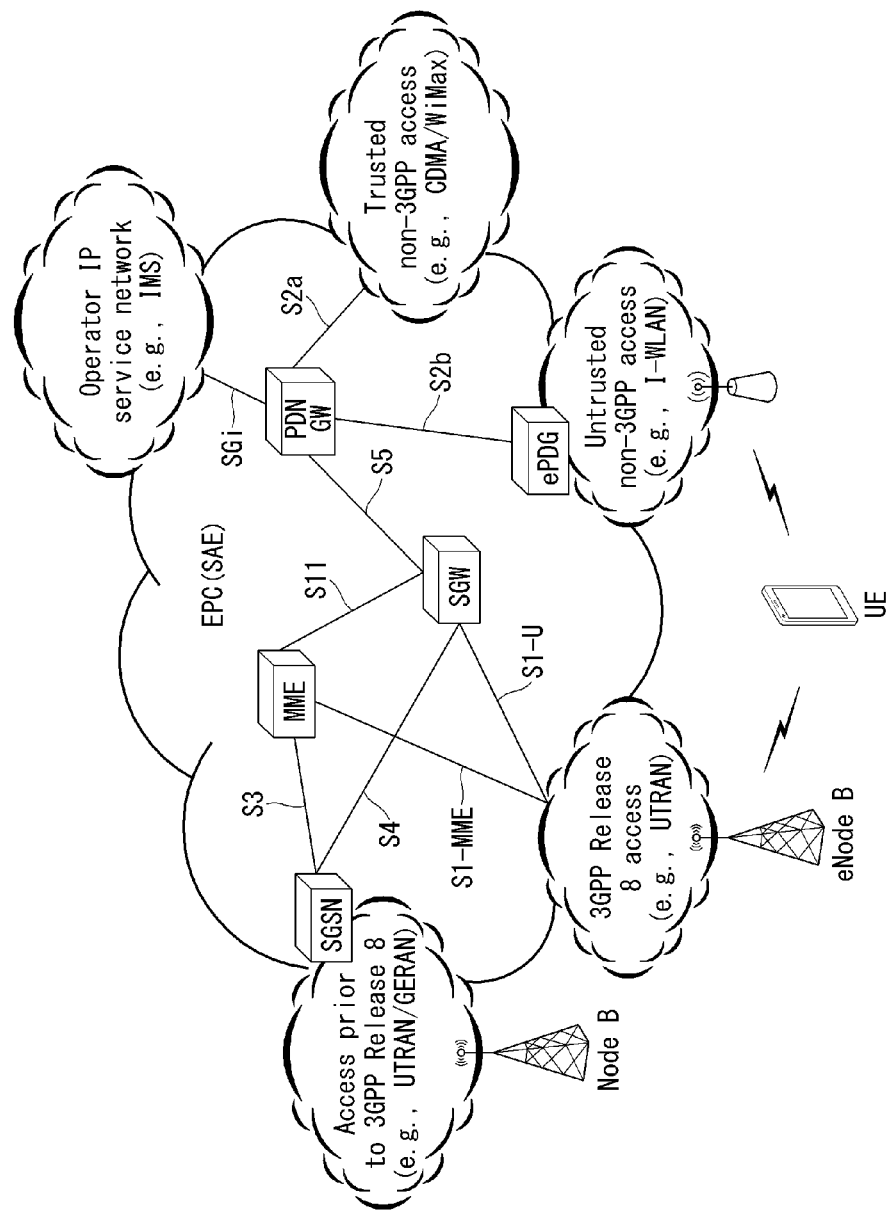
FIG. 1 is a diagram briefly illustrating an evolved packet system (EPS) to which the present invention may be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention may be embodied without the specific information.

For some cases, to avoid obscuring the technical principles of the present invention, structures and devices well-known to the public may be omitted or may be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Also, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present invention, and the specific terms may be used in different ways as long as it does not leave the technical scope of the present invention.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA may be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention may be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention may be supported by the documents above. Also, all of the terms disclosed in this document may be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE may be called a terminal, Mobile Equipment (ME), or Mobile Station (MS). A UE may be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS may perform functions of configuration storage, identity management, user state storage, and so on.

Public Land Mobile Network (PLMN): a network formed to provide mobile communication services to individuals. The PLMN may be formed separately for each operator.

In what follows, the present invention will be described based on the terms defined above.

Overview of System to which the Present Invention May be Applied

FIG. 1 illustrates an Evolved Packet System (EPS) to which the present invention may be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities may be established through an IP-based base station (for example, eNodeB), EPC, and application domain (for example, IMS). In other words, the EPC provides the architecture essential for implementing end-to-end IP services.

The EPC includes various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, if UE moves across serving areas by the eNodeB, the SGW acts as an anchor point for local mobility. In other words, packets may be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW may support policy enforcement features, packet filtering, charging support, and so on. Also, the PDN GW may act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways may be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability may access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points may be defined according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point may be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
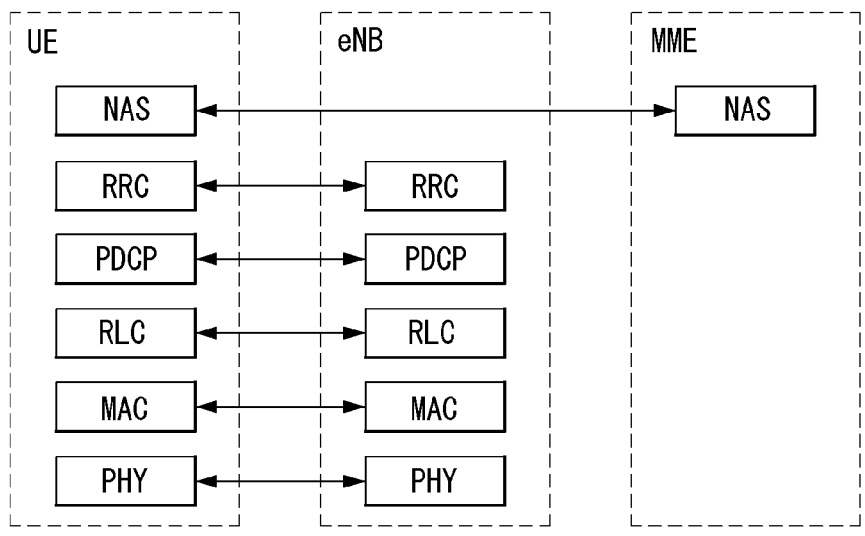
FIG. 2 shows radio interface protocol architecture between a UE and an E-UTRN in a wireless communication system to which the present invention may be applied.
Figure 2:
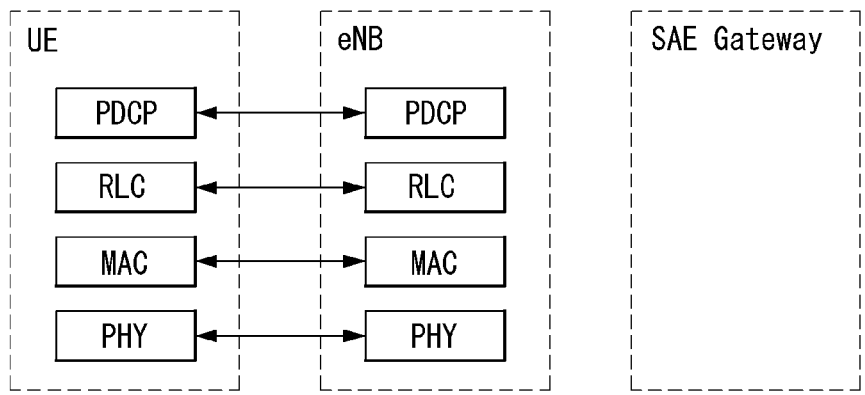

FIG. 2 illustrates a radio interface protocol structure between a UE and an E-UTRAN in a wireless communication system to which the present invention may be applied.

FIG. 2(a) illustrates a radio protocol structure for the control plane, and FIG. 2(b) illustrates a radio protocol structure for the user plane.

Referring to FIG. 2, layers of the radio interface protocol between the UE and the E-UTRAN may be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH may carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, if MAC layer performs the RLC function, the RLC layer may be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers may be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells may be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service may be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

Figure 3:
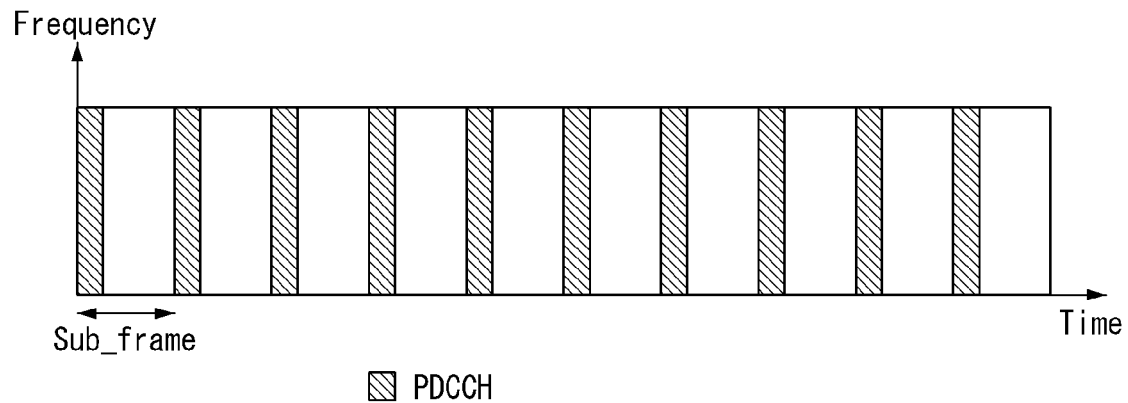
FIG. 3 is a diagram briefly illustrating the structure of a physical channel in a wireless communication system to which the present invention may be applied.

FIG. 3 is a diagram schematically exemplifying a structure of physical channel in a wireless communication system to which the present invention may be applied.

Referring to FIG. 3, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

Figure 4:
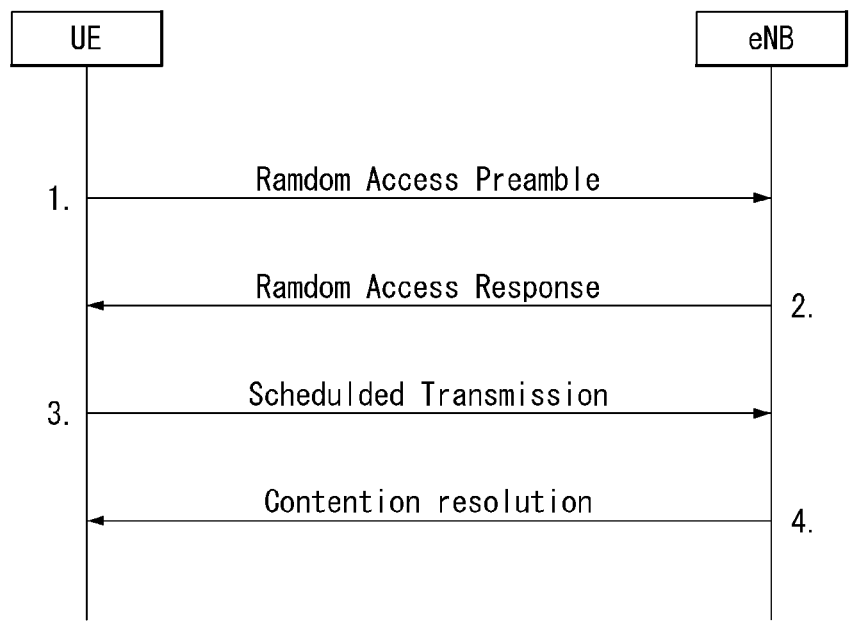
FIG. 4 is a diagram for illustrating a contention-based random access procedure in a wireless communication system to which the present invention may be applied.

FIG. 4 is a diagram for describing the contention-based random access procedure in the wireless communication system to which the present invention may be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, SAE temporary mobile subscriber identity (S-TMSI) or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB Method of Controlling Congestion of Radio Resources The standard of a next-generation 5G system subsequent to the 4G LTE system is completed based on the development of the communication technology. Accordingly network equipment and UEs supporting the 5Generation (5G) technology emerge.

The reason why the 3G communication system suddenly switched to the 4Generation (4G) communication system is that the 4G communication system is fast compared to the 3Generation (3G) communication system and can provide high-capacity data services. Furthermore, an operation device capable of satisfying various requirements of users has timely emerged even in a mobile environment, for example, a smartphone, and thus a condition in which the 4G communication system could be used has been provided. In line with this, the 4G communication system has been supplied so rapidly compared to the 3G communication system.

The standard of the 5G communication system that guarantees a faster and higher data transmission rate compared to the 4G communication system has been completed. Network equipment and UEs based on the standard have emerged.

From the standpoint of a communication service provider, however, there is a limit to the introduction of the 5G communication system compared to the 4G communication system. First, the 5G communication system has a higher initial introduction cost than the 4G communication system because it is not yet a spreading stage. Furthermore, the emergency of an attractive killer application to the extent that current 4G communication service users request switching to the 5G communication system is delayed.

Accordingly, the 5G communication system provides options in which communication service providers can combine the 5G communication system and the 4G communication system in various ways. For example, current 4G communication service providers may use the 5G communication system using the following methods.

4G communication system and 5G communication system-independent operations: method of providing service by independently introducing a separate 5G communication system into the existing 4G communication system 4G communication system and 5G radio network introduction and operation: method of introducing only a 5G radio network among a 5G communication system without introducing the entire 5G communication system and using the 5G radio network dependent on the 4G communication system 4G communication system and 5G core network introduction and operation: method for a service provider to introduce only a 5G core network without introducing a 5G radio system and to associate a radio system of 4G communication with the 4G core network and the 5G core network. This is a method of using a function, such as network slicing of 5G by using 4G in radio and 5G in a core network Particularly, current service providers are interested in a 5G radio network among a 5G communication system and a new radio access technology (RAT) (new RAT (NR)), that is, a radio access technology thereof. The reason for this is that NR is a ultra-low latency, ultra-reliability, ultra-wideband radio access technology.

However, as described above, the 5G communication system will have a very higher introduction cost than the 4G communication system for some time. Furthermore, it is expected that the introduction of the 5G communication system will be late from the viewpoint of consumers because a UE supporting the 5G communication system is much more expensive than a UE supporting only the 4G communication system.

However, when the use pattern of consumers are viewed, it is expected that the demand for data communication will continue to increase because the use pattern is changed from the existing voice to data and the existing text/photo-based data consumption changes to moving image-based data consumption. This means a congestion situation in the existing 4G communication system will continue to be degraded from the standpoint of communication service providers. This means that the use of an access control mechanism (access barring check operation) for controlling a congestion and adjusting a load in the entire communication system is expanded.

However, the existing access control mechanism/operation has the following problems.

An access class barring mechanism used from the 2Generation (2G) communication system is defined based on an access class assigned to each subscriber upon subscription. This has a problem in that the features of each UE or the characteristics of traffic in each situation are not taken into consideration.

An application specific congestion control for data communication (ACDC) mechanism introduced in the 4G communication system is a method of controlling access for each access category by which a communication service provider has classified applications based on given criteria. An application that is not recognized by a communication service provider or has low priority set by a communication service provider may be recognized as having poor quality of communication service from the viewpoint of users because more restriction is applied to access to the application.

Accordingly, the present invention proposes an access control method in the situation in which various communication systems are present depending on the deployment of 5G communication systems and different sub-networks and radio access methods of different communication systems are present depending on the strategy of each communication service provider. Specifically, the present invention proposes an access control method capable of preventing a congestion situation which may occur in the operation of a communication system, rapidly processing a congestion situation, and providing the best radio service provision to each UE in a congestion situation by providing a different radio access opportunity based on the features of a UE in the above situation.

Particularly, if a communication system (e.g., 4G communication system) additionally supports a different radio access network or radio access technology (secondary access) in addition to a basic radio access network or basic radio access technology based on a service provider configuration, the communication system notifies a UE, attempting to access thereto, of information regarding that the corresponding UE will use which access control mechanism or will skip/omit which access control mechanism.

Furthermore, if a UE itself has to access a communication network, it determines that which access control mechanism has been activated in each cell. Furthermore, the UE determines which access control mechanism may be skipped using its own condition with respect to each access control mechanism activated in a cell. Thereafter, the UE tests/checks whether it can actually attempt access to an access control mechanism to be applied by the UE, and attempts access when the UE passes the test/check.

Preferably, in the above process, when the communication system notifies the UE whether an access control mechanism can be skipped in the cell, the communication system may additionally notify the UE of information on whether the UE can skip the access control mechanism when a given condition (hereinafter referred to as a skip condition for access barring) is satisfied. Furthermore, the UE skips the corresponding access control mechanism when the skip condition for such access barring is satisfied.

Preferably, in the above process, the skip condition for access barring in which the access control mechanism can be skipped may include a radio access technology supported in the communication system and/or a supported radio frequency band, for example.

For example, the followings are examples to which an embodiment proposed in the present invention is applied.

1. It is assumed that a UE A and a UE B camp on a cell C based on an E-UTRA radio access method managed by an eNB N.

In this case, the eNB N may additionally provide radio access service through a frequency band FB2 according to an NR radio access method. A radio resource used in this case is called a cell D. Furthermore, it is assumed that the cell D supports the NR method, but a UE cannot directly search for the cell D. For example, a communication service provider may not transmit a system information block (SIB) in the cell D so that a UE cannot camp on the cell D. Accordingly, the UE cannot camp on the cell D because the cell D does not transmit the SIB and thus the UE cannot search for the cell D in the idle mode.

Furthermore, the UE A supports NR at the same time in addition to E-UTRA, and also supports FB2.

Furthermore, the UE B does not support NR.

2. A short phenomenon of radio resources occurs because many users are present in the cell C. Access control is activated through the SIB of the cell C.

3. A congestion situation has occurred in the cell C, but a congestion situation does not occur in the cell D in the process.

4. The eNB N determines that it can additionally provide communication service because a congestion situation has not yet occurred in the cell D, and determines to provide radio service through the cell D.

5. To this end, the eNB N maintains access control activated in the cell C, but updates the SIB so that a UE supporting NR in the FB2 can reduce or skip an access control mechanism simultaneously with an E-UTRA operation. For example, in the case of access control barring (ACB), the eNB N instructs UEs so that a UE not supporting NR and FB2 performs an access control mechanism by applying ACB and a UE supporting NR and FB2 skips ACB.

6. The UE A and the UE B receive the updated SIB. Thereafter, data occurs in each UE, and each UE determines to apply or skip which access control mechanism. That is, the UE determines whether to apply or skip an access control mechanism by determining whether a skip condition for an access barring check operation included in the SIB is satisfied.

In this process, the UE B performs ACB because it does not support NR/FB2, and then determines whether to perform access based on a result of the check. In contrast, since a UE supporting NR/FB2 has received information regarding that it can skip ACB in the SIB, the UE A skips the ACB and immediately performs access.

7. The eNB confirms that the UE A supports NR/FB2, and provides the UE with radio service using the resource of the cell D. In this process, the radio service using the resource of the cell C will be minimized because a radio congestion situation has occurred in the cell C.

In the above-described process, the eNB may preferentially provide an access opportunity to the UE supporting NR, for example, because each UE may have different characteristics although a radio congestion situation has occurred in the cell C. Accordingly, if the UE has not obtained an access opportunity, a user's degree of satisfaction can be improved because the utilization of the resource of the cell D that might have been wasted without being used can be increased.

Furthermore, a communication system in its viewpoint may first provide radio service to a UE capable of access to another cell using the resource of the cell D, compared to a case where all UEs contend for the same in a congestion situation, that is, for an access opportunity in the cell C. Accordingly, the radio congestion situation in the cell C can be rapidly solved because the number of UEs contending for a congested resource in order to receive service is gradually reduced.

Furthermore, a congestion of radio resources does not additionally occur in the cell C because service is provided to the UE A using the radio resource of the cell D.

Furthermore, the above-described process has proposed a method of solving a radio congestion situation using the NR radio access technology based on an E-UTRA cell, but the present invention is not limited thereto and other combinations are possible. The followings are some examples of the combinations.

There is a case where an NR cell is a main cell and the NR cell can additionally manage an E-UTRA-based radio resource. For example, if the NR cell is congested, an UE supporting E-UTRA may first obtain an access opportunity.

There is a case where an E-UTRA cell is a main cell and the E-UTRA cell can additionally use another technology, such as an unlicensed band or a wireless LAN (WLAN). In this case, if the E-UTRA cell is congested, the E-UTRA cell may first provide an access opportunity to a UE supporting a WLAN or an unlicensed band. Likewise, a similar operation may be applied based on an NR cell instead of E-UTRA.

In addition, various combinations may be present.

An RAT/RAN additionally connected in addition to an RAT/RAN, that is, a base, as described above may be called secondary access.

Furthermore, in the above-described process, ACB has been taken as an example and described, but the present invention is not limited thereto and may be applied to other mechanisms, such as extended access barring (EAB) and application specific congestion control for data communication (ACDC), in addition to the ACB.

In other words, a network may notify a UE whether it skips each access mechanism in which case in addition to additional field/condition information.

Furthermore, as described above, whether to skip a specific access mechanism may be determined by configuring/defining whether to support an additional different RAT, to support a specific frequency, to support NR or E-UTRA through a specific radio technology combination (e.g., NR+EUTRA, NR+WLAN, EUTRA+WLAN) or an unlicensed band, to support a specific technology carrier aggregation (CA) or dual connectivity (DC) (e.g., E-UTRA-NR dual connectivity (ENDC), multi-RAT dual connectivity (MRDC)), or to support secondary access as a skip condition for an access barring check operation.

In the above-described embodiment, an example of an access operation for a UE to a network may be described as follows. The following is one example and a similar other method is possible.

1> If a "skip condition for access barring" (i.e., a skip condition for an access barring check operation) is present in an SIB and a UE satisfies the condition, 3> The UE determines that access to a cell has not been barred;

1> Otherwise, if the UE is establishing an RRC connection for a mobile originating call:

2> The UE performs access barring check using a timer T303 as a "barring time (Tbarring)" and using ac-BarringForMO-Data as an "access control (AC) barring parameter", as specified in Paragraph 5.3.3.11 of 3GPP TS 36.331.

2> If access to the cell is barred:

3> If SystemInformationBlockType2 (SIB2) includes ac-BarringForCSFB or the UE does not support circuit switched (CS) fallback:

4> When the procedure is terminated, the UE notifies the higher layer of a failure of the establishment of the RRC connection or a failure of the resumption of an RRC connection having suspend indication, and notifies the higher layer that access barring for a mobile originating call may be applied;

3> Otherwise, (the SIB2 does not include ac-BarringForCSFB and the UE supports CS fallback):

4> If a timer T306 is not running, the UE starts T306 as a timer value of T303;

4> When the procedure is terminated, the UE notifies the higher layer of a failure of the establishment of the RRC connection or a failure of the resumption of an RRC connection having suspend indication, and notifies the higher layer that access barring for a mobile originating call and mobile originating CS fallback may be applied;

1> Otherwise, if the UE is establishing an RRC connection for mobile originating signalling:

2> The UE performs access barring check using a timer T305 as a "barring time (Marring)" and using ac-BarringForMO-Signalling as an "AC barring parameter", as specified in Paragraph 5.3.3.11 of 3GPP TS 36.331;

2> If access to the cell is barred:

3> When the procedure is terminated, the UE notifies the higher layer of a failure of the establishment of the RRC connection or a failure of the resumption of an RRC connection having suspend indication, and notifies the higher layer that access barring for mobile originating signalling may be applied;

1> Otherwise, if the UE is establishing an RRC connection for mobile originating CS fallback:

2> If the SIB2 includes ac-BarringForCSFB:

3> The UE performs access barring check using a timer T306 as a "barring time (Marring)" and using ac-BarringForCSFB as an "AC barring parameter", as specified in Paragraph 5.3.3.11 of 3GPP TS 36.331;

3> If access to the cell is barred:

4> When the procedure is terminated, the UE notifies the higher layer of a failure of the establishment of the RRC connection or a failure of the resumption of an RRC connection having suspend indication, and notifies the higher layer that access barring for mobile originating CS fallback may be applied due to ac-BarringForCSFB;

2> Otherwise:

3> The UE performs access barring check using the timer T306 as a "barring time (Marring)" and using ac-BarringForMO-Data as an "AC barring parameter", as specified in Paragraph 5.3.3.11 of 3GPP TS 36.331;

3> If access to the cell is barred:

4> If the timer T303 is not running, the UE starts T303 as a timer value of T306;

4> When the procedure is terminated, the UE notifies the higher layer of a failure of the establishment of the RRC connection or a failure of the resumption of an RRC connection having suspend indication, and notifies the higher layer that mobile originating CS fallback, access barring for a mobile originating call, and mobile originating CS fallback may be applied due to BarringForMO-Data;

1> Otherwise, if the UE is establishing an RRC connection for a mobile originating multimedia telephony service (MMTEL) voice, a mobile originating MMTEL video, a mobile originating short message service over Internet protocol (SMSoIP) or mobile originating SMS (mobile originating):

2> If the UE is establishing an RRC connection for a mobile originating multimedia telephony service (MMTEL) voice and the SIB2 includes ac-BarringSkipForMMTELVoice; or 2> If the UE is establishing an RRC connection for a mobile originating MMTEL video and the SIB2 includes ac-BarringSkipForMMTELVideo; or 2> If the UE is establishing an RRC connection for a mobile originating SMSoIP or mobile originating SMS (mobile originating) and the SIB2 includes ac-BarringSkipForSMS:

3> The UE determines that access to the cell is not barred;

2> Otherwise:

3> If an establishment cause (establishmentCause) received from a higher layer is set as mobile originating signalling (mo-Signalling) (also include a case where mo-Signalling is replaced with high priority access (highPriorityAccess) according to 3GPP TS 24.301 or a case where mo-Signalling is replaced with a mobile originating voice call (mo-VoiceCall) according to Paragraph 5.3.3.3 of 3GPP TS 36.331):

4> The UE performs access barring check using a timer T305 as a "barring time (Tbarring)" and using ac-BarringForMO-Signalling as an "AC barring parameter", as specified in Paragraph 5.3.3.11 of 3GPP TS 36.331;

4> If access to the cell is barred:

5> When the procedure is terminated, the UE notifies the higher layer of a failure of the establishment of the RRC connection or a failure of the resumption of an RRC connection having suspend indication, and notifies the higher layer that access barring for mobile originating signalling may be applied;

3> If an establishment cause (establishmentCause) received from a higher layer is set as mobile originating data (mo-Data) (also includes a case where mo-Data is replaced with high priority access (highPriorityAccess) according to 3GPP TS 24.301 or a case where mo-Data is replaced with a mobile originating voice call (mo-VoiceCall) according to Paragraph 5.3.3.3 of 3GPP TS 36.331):

4> The UE performs access barring check using the timer T303 as a "barring time (Marring)" and using ac-BarringForMO-Data as an "AC barring parameter", as specified in Paragraph 5.3.3.11 of 3GPP TS 36.331;

4> If access to the cell is barred:

5> If the SIB2 includes ac-BarringForCSFB and the UE does not support CS fallback:

6> When the procedure is terminated, the UE notifies the higher layer of a failure of the establishment of the RRC connection or a failure of the resumption of an RRC connection having suspend indication, and notifies the higher layer that access barring for a mobile originating call may be applied;

5> Otherwise (the SIB2 does not include ac-BarringForCSFB and the UE supports CS fallback):

6> If the timer T306 is not running, the UE starts T306 as a timer value of T303;

6> When the procedure is terminated, the UE notifies the higher layer of a failure of the establishment of the RRC connection or a failure of the resumption of an RRC connection having suspend indication, and notifies the higher layer that access barring for a mobile originating call and mobile originating CS fallback may be applied;

Hereinafter, access barring check specified in Paragraph 5.3.3.11 of 3GPP TS 36.331 is described.

1> If a timer T302 or a "barring time (Tbarring)" is running:

2> a UE determines that access to a cell has been barred;

1> Otherwise, if SIB2 includes an "AC barring parameter":

2> If the SIB2 includes a "skip condition for an AC barring parameter":

3> The UE checks whether it satisfies the skip condition for an AC barring parameter;

3> If the UE satisfies the condition:

4> The UE determines that access to the cell has not been barred;

2> Otherwise, if the UE has one or more access classes having a value within a range 11~15, if the one or more access classes are valid to be used by the UE in accordance with 3GPP TS 22.011 and 3GPP TS 23.122, as stored in a universal subscriber identity module (USIM), and
 2> If a corresponding bit within ac-BarringForSpecialAC included in an "AC barring parameter" is set to 0 with respect to at least one of the valid access classes:
  3> The UE determines that access to the cell is not barred;
 2> Otherwise:
  3> The UE derives a given number "rand" uniformly distributed within a 0≤rand<1 range;
  3> When "rand" is smaller than a value indicated by an AC barring factor (ac-BarringFactor) included in the "AC barring parameter":
   4> The UE determines that access to the cell has not been barred;
  3> Otherwise,
   4> The UE determines that access to the cell has been barred;
1> Otherwise:
 2> The UE determines that access to the cell has not been barred;
1> If access to the cell is barred and a timer T302 and a "barring time (Tbarring)" are not running:
 2> The UE derives a given number "rand" uniformly distributed within a 0≤rand<1 range;
 2> The UE starts a timer "barring time (Tbarring)" based on a timer value calculated as below using an AC barring time (ac-BarringTime) included in the "AC barring parameter":
  "Tbarring"=(0.7+0.6*rand)*ac-BarringTime;

Hereinafter, an extended access barring (EAB) check (EAB check) specified in Paragraph 5.3.3.12 of 3GPP TS 36.331 is described.

A UE performs the EAB check as follows:
1> If SystemInformationBlockType14 (SIB14) is present and the SIB14 includes an EAB parameter (eab-Param):
 2> If a "skip condition for EAB" is included in the EAB parameter (eab-Param):
  3> If the UE satisfies the "skip condition for EAB":
   4> The UE determines that access to a cell has not been barred;
 2> Otherwise if EAB common (eab-Common) is included in the EAB parameter (eab-Param):
  3> If the UE belongs to the category of the UE as indicated in an EAB category (eab-Category) within the EAB common (eab-Common); and
  3> If a corresponding bit within an EAB barring bitmap (eab-BarringBitmap) included in the EAB common (eab-Common) is set to 1 as stored in the USIM with respect to an access class of the UE having a value within a 0~9 range:
   4> The UE determines that access to the cell has been barred;
  3> Otherwise:
   4> The UE determines that access to the cell has not been barred due to EAB;
 2> Otherwise (EAB list per PLMN (eab-PerPLMN-List) is included in the EAB parameter (eab-Param)):
  3> The UE selects an entry within an EAB list per PLMN (eab-PerPLMN-List) corresponding to the PLMN selected by the higher layer;
  3> If an EAB configuration (eab-Config) for the PLMN is included:
   4> If the UE belongs to the category of the UE as indicated in an EAB category (eab-Category) included in the EAB configuration (eab-Config); and
   4> If a corresponding bit within an EAB barring bitmap (eab-BarringBitmap) included in an EAB configuration (eab-Config) is set to 1 as stored in the USIM with respect to the access class of a UE having a value within a 0~9 range:
    5> The UE determines that access to the cell has been barred;
   4> Otherwise:
    5> The UE determines that access to the cell has not been barred due to EAB;
  3> Otherwise:
   4> The UE determines that access to the cell has not been barred due to EAB;
1> Otherwise:
 2> The UE determines that access to the cell has not been barred due to EAB;

Hereinafter, access barring check for application specific congestion control for data communication (ACDC) specified in Paragraph 5.3.3.13 of 3GPP TS 36.331 is described.

The UE performs the access barring check as follows:
1> If the timer T302 is running:
 2> The UE determines that access to a cell has been barred;
1> Otherwise, if SIB2 includes "ACDC barring parameter":
 1> Furthermore, when a "skip condition for ACDC barring" is present, if the UE does not satisfy the "skip condition for ACDC barring" or the "skip condition for ACDC barring" is not present:
  2> The UE derives a given number "rand" uniformly distributed within a 0≤rand<1 range;
  2> When "rand" is smaller than a value indicated by an AC barring factor (ac-BarringFactor) included in an "ACDC barring parameter":
   3> The UE determines that access to the cell has not been barred;
  2> Otherwise:
   3> The UE determines that access to the cell has been barred;
 1> Otherwise:
  2> The UE determines that access to the cell has not been barred;
1> If access to the cell has been barred and a timer T302 is not running:
 2> The UE derives a given number "rand" uniformly distributed within a 0≤rand<1 range;
 2> The UE starts a timer "barring time (Tbarring)" based on a timer value calculated as below using an AC barring time (ac-BarringTime) included in the "ACDC barring parameter."

"*Tbarring*"=(0.7+0.6*rand)**ac*-BarringTime.

Hereinafter, an example in which a condition in which an access control mechanism may be skipped (e.g., a skip condition for AC barring (skip-condition-for-ac-barring)) is delivered to a UE within SystemInformationBlockType2 (SIB2) is described.

SIB2 includes radio resource configuration information applied to all UEs in common. Furthermore, it includes a functionality for a parameter provided within another SIB, and a related UE timer and constant.

Table 2 illustrates some of an SIB2 information element (IE).

TABLE 2

```
-- ASN1START
SystemInformationBlockType2 ::= SEQUENCE {
    ac-BarringInfo                    SEQUENCE {
skip-condition-for-ac-barring    barringSkipCondition
ac-BarringForEmergency                BOOLEAN,
        ac-BarringForMO-Signalling    AC-BarringConfig        OPTIONAL,
        -- Need OP                    AC-BarringConfig        OPTIONAL
        ac-BarringForMO-Data
        -- Need OP
    }                                                          OPTIONAL, -- Need
OP
    radioResourceConfigCommon         RadioResourceConfigCommonSIB,
    ue-TimersAndConstants             UE-TimersAndConstants,
    freqinfo                          SEQUENCE {
            ul-CarrierFreq            ARFCN-ValueEUTRA        OPTIONAL,
    -- Need OP
            ul-Bandwidth              ENUMERATED {n6, n15, n25, n50, n75, n100}
                                                              OPTIONAL, -- Need
OP
            additionalSpectrumEmission    AdditionalSpectrumEmission
    },
    mbsfn-SubframeConfigList          MBSFN-SubframeConfigList
OPTIONAL,    -- Need OR
    timeAlignmentTimerCommon          TimeAlignmentTimer,
    ...,
    lateNonCriticalExtension          OCTET        STRING    (CONTAINING
SystemInformationBlockType2-v8h0-IEs)                        OPTIONAL,
    [[      ssac-BarringForMMTEL-Voice-r9    AC-BarringConfig    OPTIONAL,
    -- Need OP
            ssac-BarringForMMTEL-Video-r9    AC-BarringConfig    OPTIONAL
    -- Need OP
    ]],
    [[      ac-BarringForCSFB-r10            AC-BarringConfig    OPTIONAL
    -- Need OP
    ]],
    [[      ac-BarringSkipForMMTELVoice-r12    ENUMERATED    {true}
OPTIONAL,    -- Need OP
            ac-BarringSkipForMMTELVideo-r12    ENUMERATED    {true}
OPTIONAL,    -- Need OP
            ac-BarringSkipForSMS-r12           ENUMERATED    {true}
OPTIONAL,    -- Need OP
            ac-BarringPerPLMN-List-r12        AC-BarringPerPLMN-List-r12
        OPTIONAL -- Need OP
    ]],
    [[      voiceServiceCauseIndication-r12    ENUMERATED    {true}    OPTIONAL
    -- Need OP
    ]],
    [[
skip-condition-for-acdc-barring    barringSkipCondition
```

Table 3 illustrates a description of fields included in the SIB2 IE illustrated in Table 2.

TABLE 3

Description of SIB2 fields ac-BarringFactor
When a given number derived by a UE is smaller than this value, access is granted. If not, access is barred. The value is interpreted within a range that is equal to greater than 0 and smaller than 1. p00 = 0, p05 = 0.05, p10 = 0.10,..., p95 = 0.95. Values other than p00 may be set only when all bits corresponding to ac-BarringForSpecialAC are set to 0.
ac-BarringForCSFB
Access control barring for mobile originating CS fallback
ac-BarringForEmergency
Access control barring for an access class 10
ac-BarringForMO-Data
Access control barring for mobile originating calls TABLE 3-continued Description of SIB2 fields ac-BarringForMO-Signalling
Access control barring for mobile originating signalling
ac-BarringForSpecialAC
Access control barring for access classes 11-15. The first/leftmost bit is for the access class 11, the second bit is for the access class 12, etc.
ac-BarringTime
An average access barring time value in second
acdc-BarringConfig
A barring configuration for an ACDC category. When the field is not present, access to a cell has not been barred for an ACDC category.
acdc-Category
Indicates an ACDC category.
ssac-BarringForMMTEL-Video
Service-specific access class barring for an MMTEL video originating call

TABLE 3-continued

Description of SIB2 fields ssac-BarringForMMTEL-Voice
Service-specific access class barring for MMTEL voice originating calls SystemInformationBlockType14 (SIB14) includes an EAB parameter.

Table 4 illustrates some of the SIB14 IE.

TABLE 4

```
-- ASN1START
SystemInformationBlockType14-r11 ::=    SEQUENCE {
    eab-Param-r11                           CHOICE {
        skip-condition-for-eab      barringSkipCondition
        eab-Common-r11              EAB-Config-r11,
        eab-PerPLMN-List-r11        SEQUENCE (SIZE (1..maxPLMN-r11)) OF EAB-
ConfigPLMN-r11
    }
                                    OPTIONAL, -- Need OR
    lateNonCriticalExtension            OCTET STRING    OPTIONAL,
    ...
}
EAB-ConfigPLMN-r11 ::=                  SEQUENCE {
    eab-Config-r11      EAB-Config-r11      OPTIONAL -- Need OR
}
EAB-Config-r11 ::=                      SEQUENCE {
    eab-Category-r11    ENUMERATED {a, b, c},
    eab-BarringBitmap-r11   BIT STRING (SIZE (10))
}
-- ASN1STOP
```

Table 5 illustrates a barring skip condition (barringSkipCondition) (i.e., a skip condition for an access barring check operation) within the skip condition for AC barring (skip-condition-for-ac-barring) field illustrated in Table 2 and Table 4.

TABLE 5

| barringSkipCondition ::= | SEQUENCE { |
|---|---|
| supportOfENDC | SupportofENDC |
| supportOfLAA | SupportofLAA |
| supportOfLWA | SupportofLWA |
| supportOfMRDC | SupportofMRDC |
| supportOfNR | SupportofNR |

Table 6 shows a description of the barring skip condition (barringSkipCondition) (i.e., a skip condition for an access barring check operation) field illustrated in Table 5.

TABLE 6

Description of barring skip condition (barringSkipCondition) field

SupportofENDC
SupportofENDC indicates whether a UE supports E-UTRA-NR dual connectivity (ENDC). Optionally, frequency information may be added.
If SupportofENDC is set as yes or skip or SupportofENDC is present, a UE may skip an associated access control mechanism/operation and may determine that a cell has not been barred.
SupportofLAA
SupportofLAA indicates whether a UE supports licensed assisted access (LAA). Optionally, frequency information may be added.
If SupportofLAA is set as yes or skip or SupportofLAA is present, a UE may skip an associated access control mechanism/operation, and may determine that a cell has not been barred.
SupportofLWA
SupportofLWA indicates whether a UE supports an LTE-WLAN aggregation (LWA). Optionally, frequency information may be added.

TABLE 6-continued

Description of barring skip condition (barringSkipCondition) field

If SupportofLWA is set as yes or skip or SupportofLWA is present, a UE may skip an associated access control mechanism/operation, and may determine that a cell has not been barred.
SupportofMRDC
SupportofMRDC indicates whether a UE supports multi-RAT dual connectivity (MRDC). Optionally, frequency information may be added.

TABLE 6-continued

Description of barring skip condition (barringSkipCondition) field

If SupportofMRDC is set as yes or skip or SupportofMRDC is present, a UE may skip an associated access control mechanism/operation, and may determine that a cell has not been barred.
SupportofNR
SupportofNR indicates whether a UE supports new RAT (NR). Optionally, frequency information may be added.
If SupportofNR is set as yes or skip or SupportofNR is present, a UE may skip an associated access control mechanism/operation, and may determine that a cell has not been barred.

Furthermore, additionally, in the above-described process, in relation to network slicing, information, such as network slice selection assistance information (N-SSAI) (e.g., if an N-SSAI-related field is defined as set as yes or skip or the corresponding field is present, a UE may skip an associated access control mechanism/operation and may determine that a cell has not been barred), a slice/service type (SST) (this indicates a network slice operation expected in a feature and service viewpoint (e.g., if an SST-related field is defined and set as yes or skip or the corresponding field is present, a UE may skip an associated access control mechanism/operation and may determine that a cell has not been barred), or a slice differentiator (SD) (this is information that supplements an SST for classifying multiple network slices of the same SST (e.g., if an SD-related field is defined and set as yes or skip or the corresponding field is present, a UE may skip an associated access control mechanism/operation and may determine that a cell has not been barred) may be used as a condition in which access control may be skipped.

Figure 5:
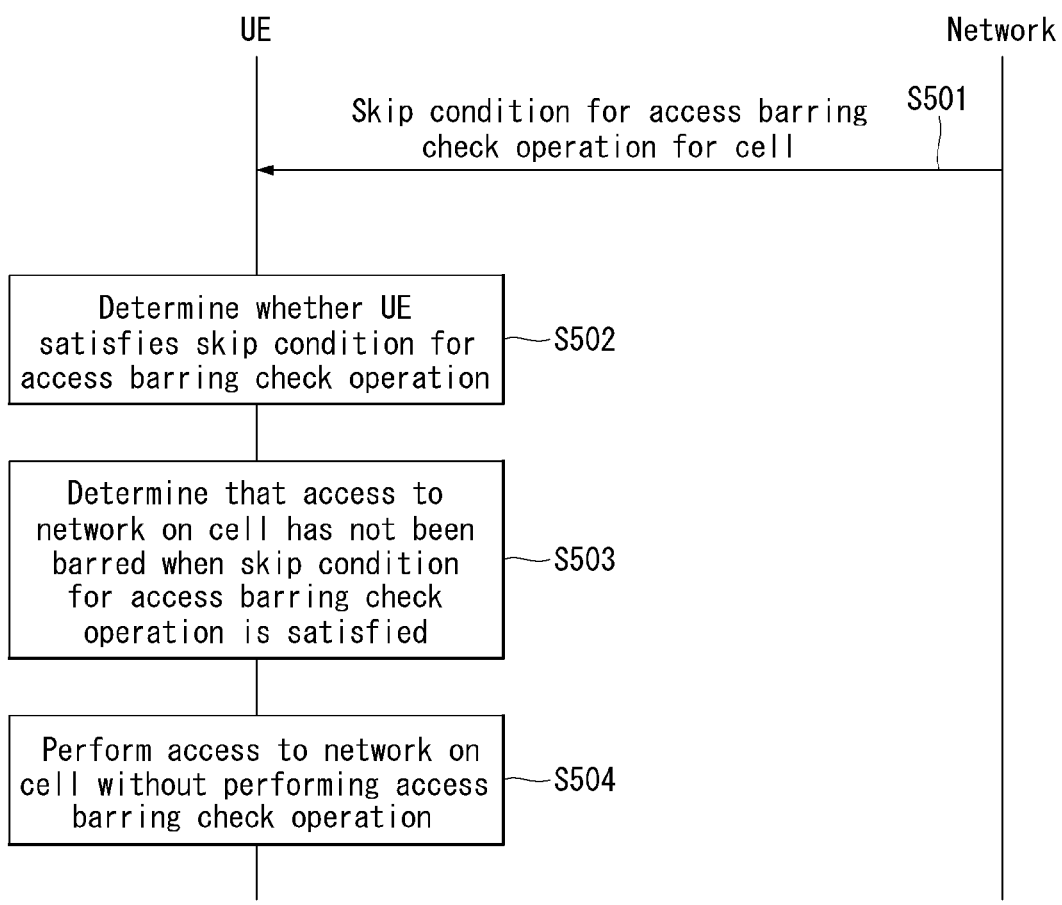
FIG. 5 is a diagram illustrating a method of accessing a network according to an embodiment of the present invention.

FIG. 5 is a diagram illustrating a method of accessing a network according to an embodiment of the present invention.

Referring to FIG. 5, a UE receives a skip condition for an access barring check operation for a cell, supported by a corresponding (radio) network, from the (radio) network (e.g., base station) (S501).

In this case, the skip condition for an access barring check operation may include one or more of the support of ENDC, the support of MRDC, the support of LAA, the support of LWA or the support of NR. In this case, as described above, if a field for each condition is defined and the corresponding field is set yes/skip or the corresponding field is present (e.g., within an SIB), it may mean that the corresponding condition has been activated (i.e., need to determine whether the UE satisfies the condition).

Furthermore, the skip condition for an access barring check operation may include one or more of the support of an additional different RAT, the support of a specific frequency, a specific radio technology combination (e.g., NR+EUTRA, NR+WLAN, EUTRA+WLAN), the support of NR or E-UTRA through an unlicensed band, or the support of a specific CA or DC (e.g., ENDC, MRDC). Likewise, if a field for each condition is defined and the corresponding field is set as yes/skip or the corresponding field is present (e.g., within an SIB), this may mean that the corresponding condition has been activated (i.e., need to determine whether a UE satisfies the condition).

In this case, one or more skip conditions for an access barring check operation may be configured for each cell. That is, when a (radio) network (e.g., base station) supports a plurality of cells, a skip condition for an access barring check operation may be different for each cell. For example, when a (radio) network (e.g., base station) supports cells A and B, conditions a and b may be configured for the cell A, and conditions a, c and d may be configured for the cell B.

Furthermore, a plurality of access control operations, such as ACB, EAB, and ACDC, may be available (i.e., defined). In this case, one or more skip conditions for an access barring check operation may be configured for each access barring check operation. That is, a skip condition for an access barring check operation may be different for each access barring operation. For example, when access barring check operations ACB and EAB are available (i.e., defined), conditions a, c may be configured for the access barring check operation ACB, and conditions b, c, d may be configured for the access barring check operation EAB.

Furthermore, one or more skip conditions for an access barring check operation may be configured for each cell or for each access barring check operation. That is, when a (radio) network (e.g., base station) supports a plurality of cells, a different (or the same) access barring check operation may be available (i.e., defined) for each cell. Furthermore, a skip condition for an access barring check operation may be different for each access barring check operation. For example, when a (radio) network (e.g., base station) supports cells A and B and ACB and ACDC are available (i.e., defined) for all cells in common, conditions a and b may be configured for the ACB of the cells A and B, and conditions a, c, and d may be configured for the ACDC of the cells A and B. Furthermore, when a base station supports cells A and B, EAB is available (i.e., defined) for the cell A, and EAB and ACDC are available (i.e., defined) for the cell B, conditions a and b may be configured for the EAB of the cell A, conditions b, c and d may be configured for the EAB of the cell B, and conditions a and d may be configured for the ACDC of the cell B.

In this case, the skip condition for an access barring check operation may be transmitted through an SIB.

The UE determines whether it satisfies the skip condition for an access barring check operation (S502).

For example, if the skip condition for an access barring check operation includes one or more of the support of ENDC, the support of MRDC, the support of LAA, the support of LWA or the support of NR (or if a corresponding field is set as yes/skip), the UE determines whether it satisfies the corresponding one or more conditions (i.e., whether the UE supports ENDC/MRDC/LAA/LWA/NR).

Furthermore, if the skip condition for an access barring check operation includes one or more of the support of an additional different RAT, the support of a specific frequency, a specific radio technology combination (e.g., NR+EUTRA, NR+WLAN, EUTRA+WLAN), the support of NR or E-UTRA through an unlicensed band, or the support of a specific CA or DC (e.g., ENDC, MRDC) (or if a corresponding field is set as yes/skip), the UE determines whether it satisfies the corresponding one or more conditions.

When the skip condition for an access barring check operation is satisfied, the UE determines that access to the (radio) network on a cell (i.e., access to a base station/cell) has not been barred (S503).

In contrast, if the skip condition for an access barring check operation is not satisfied, the UE determines whether access to a cell has been barred by performing the above-described access operation on the (radio) network of the UE.

The UE performs access to the (radio) network on a cell (i.e., access to a base station/cell) without performing access barring check operation (S504).

In this case, as described above, the access barring check operation may include one or more of ACB, EAB or ACDC.

In the above-described embodiment, a UE determines whether to apply an access control mechanism based on a skip condition for an access barring check operation, indicated in a cell, in the state in which the UE is unaware of that a cell on which the UE now camps supports which access technology, and operates based on a result of the determination.

However, in the process, it is better to minimize transmission and reception through the cell on which the UE camps because a radio congestion situation has occurred in this call. Accordingly, in the process, it is preferred to use another radio resource, another radio access function as soon as possible. In this case, at the early stage of an RRC connection, a network is unaware of whether a UE has performed which access control mechanism or has skipped which access control mechanism. Accordingly, an additional radio congestion phenomenon may occur because the network is unaware of that the UE actually supports which another radio resource, radio access technology and thus the UE continues to perform a transmission and reception operation in the cell.

Accordingly, in the above process, if the UE skips a given access control mechanism and actually accesses the radio network in a congestion situation, the UE may notify the radio network of this. Furthermore, the (radio) network may assign radio resources to the UE more effectively based on such notification.

Particularly, when a UE accesses a (radio) network, if the UE satisfies a specific skip condition for an access barring check operation and attempts access to the (radio) network without applying a specific access barring check operation as in the above-described embodiment, the UE may notify the (radio) network of information on a skipped access control mechanism/operation, for example, information regarding that which access control mechanism/operation has been skipped, why the access control mechanism/operation has been skipped, or which skip condition for an access barring check operation has been satisfied.

Alternatively, as another method, a method may also be applied in which a UE defines a separate access control mechanism/operation applied only when the UE supports secondary access and a UE supporting secondary access applies only such a separate access control mechanism/operation.

Furthermore, a UE may transmit information, regarding whether the UE supports secondary access and the UE supports which RAT if the UE supports secondary access, to a (radio) network through an RRC connection request or an RRC connection setup complete message, or a message having an object similar to that of the message. Accordingly, the network may rapidly configure secondary access for the UE.

For example, the following is an example to which an embodiment proposed in the present invention is applied.
1. Step 6 is performed in step 1.
2. A UE performs a random access procedure (so-called random access channel (RACH) procedure) in a process of performing access. Furthermore, the UE transmits an RRC Connection Request message, for example, through the procedure.

Optionally, in this process, the UE may transmit information, regarding that which RRC access control mechanism/operation has been skipped, through the RRC Connection Request message. Alternatively, the UE may transmit information, regarding that which one of skip conditions for an access barring check operation has been satisfied, through the RRC Connection Request message.

A (radio) network receives the RRC Connection Request message from the UE. In this process, the network may be aware of that the UE has skipped which RRC access control mechanism/operation or why the UE has skipped the access control mechanism/operation by analyzing the message. Accordingly, the network may also be aware of that the UE supports which functions. This may be implemented in various manners, and may use a separate field within the RRC message or may use an additional code point in the existing establishment cause.

For example, if a UE has notified a network that it has skipped an access control mechanism because the UE supports NR and a congestion situation has occurred in a cell on which the UE has performed access, the network may allocate radio resources using NR to the UE, and may prevent the further occurrence of a congestion situation in an EUTRA cell.

Alternatively, as another method in addition to the above-proposed methods, in the above process, a network may allocate some of RACH radio resources (i.e., radio resources which may be assigned to a UE during a random access procedure) to a UE that has skipped the access control mechanism/operation. In this case, when the network notifies the UE of information on the RACH radio resources, additionally, it may notify the UE of which RACH radio resource may be used in what condition.

For example, an RACH preamble may be used as an example of an RACH radio resource. For example, if a UE supports NR, a network may indicate that the UE should use an RACH preamble No. 10. In this case, if the UE supports NR, it may use the RACH preamble. In this case, the network may immediately provide a radio service using an NR radio resource with respect to a UE that has used the RACH preamble 10, and may simultaneously suppress an additional congestion in an E-UTRA cell.

That is, this is a method using a radio resource if the radio resource is allocated based on a condition of a UE and the UE satisfies the condition.

Figure 6:
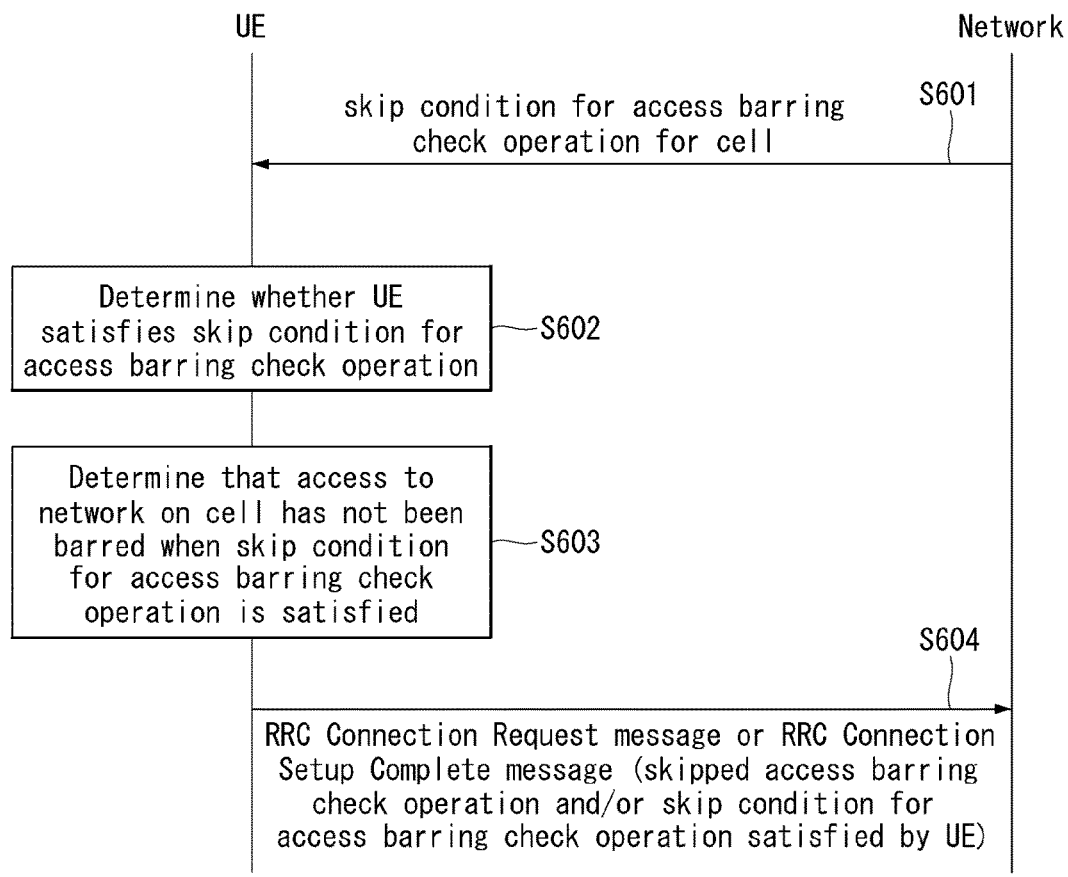
FIG. 6 is a diagram illustrating a method of accessing a network according to an embodiment of the present invention.

FIG. 6 is a diagram illustrating a method of accessing a network according to an embodiment of the present invention.

Referring to FIG. 6, a UE receives a skip condition for an access barring check operation for a cell supported by a (radio) network from the corresponding (radio) network (e.g., base station) (S601).

In this case, the skip condition for an access barring check operation may include one or more of the support of ENDC, the support of MRDC, the support of LAA, the support of LWA or the support of NR. In this case, as described above, if a field for each condition is defined and the corresponding field is set as yes/skip or the corresponding field is present (e.g., within an SIB), this may mean that the corresponding condition has been activated (i.e., need to determine whether a UE satisfies the condition).

Furthermore, the skip condition for an access barring check operation may include one or more of the support of an additional different RAT, the support of a specific frequency, a specific radio technology combination (e.g., NR+EUTRA, NR+WLAN, EUTRA+WLAN), the support of NR or E-UTRA through an unlicensed band, or the support of a specific CA or DC (e.g., ENDC, MRDC). Likewise, if a field for each condition is defined and the corresponding field is set as yes/skip or the corresponding field is present (e.g., within an SIB), this may mean that the corresponding condition has been activated (i.e., need to determine whether a UE satisfies the condition).

In this case, one or more skip conditions for an access barring check operation may be configured for each cell. That is, when a (radio) network (e.g., base station) supports a plurality of cells, the skip condition for an access barring check operation may be different for each cell.

Furthermore, a plurality of access control operations, such as ACB, EAB, and ACDC, may be available (i.e., defined). In this case, one or more skip conditions for an access barring check operation may be configured for each access barring check operation. That is, the skip condition for an access barring check operation may be different for each access barring operation.

Furthermore, one or more skip conditions for an access barring check operation may be configured for each cell or for each access barring check operation. That is, when a (radio) network (e.g., base station) supports a plurality of cells, a different (or the same) access barring check operation may be available (i.e., defined) for each cell. Furthermore, a skip condition for an access barring check operation may be different for each access barring check operation.

In this case, the skip condition for an access barring check operation may be transmitted through an SIB.

The UE determines whether it satisfies the skip condition for an access barring check operation (S602).

For example, if the skip condition for an access barring check operation includes one or more of the support of ENDC, the support of MRDC, the support of LAA, the support of LWA or the support of NR (or if a corresponding field is set as yes/skip), the UE determines whether it satisfies the corresponding one or more conditions (i.e., whether the UE supports ENDC/MRDC/LAA/LWA/NR).

Furthermore, if the skip condition for an access barring check operation includes one or more the support of an additional different RAT, the support of a specific frequency, a specific radio technology combination (e.g., NR+EUTRA, NR+WLAN, EUTRA+WLAN), the support of NR or E-UTRA through an unlicensed band, or the support of a specific CA or DC (e.g., ENDC, MRDC) (or if a corresponding field is set as yes/skip), the UE determines whether the UE satisfies the corresponding one or more conditions.

When the skip condition for an access barring check operation is satisfied, the UE determines that access to the (radio) network on a cell (i.e., access to a cell) has not been barred (S603).

In contrast, if the skip condition for an access barring check operation is not satisfied, the UE determines whether access to the cell has been barred by performing the above-described access operation for the network of the UE.

The UE performs access to the (radio) network on a cell (i.e., access to a cell) without performing access barring check operation. That is, in order to perform access to the (radio) network, the UE may perform a random access procedure (refer to FIG. 4) (S604).

During the random access procedure, the UE transmits an RRC Connection Request message or an RRC Connection Setup Complete message or a message having an object similar to that of the message to the (radio) network. In this case, the UE may transmit, to the (radio) network, information on an access control mechanism/operation skipped by the UE and/or information on a skip condition for an access barring check operation, satisfied by the UE, through the message.

Furthermore, the (radio) network may allocate some radio resources, available in a random access procedure, to a UE that satisfies a specific skip condition for an access barring check operation. For example, the (radio) network may previously allocate a random access preamble resource to a UE that satisfies a specific skip condition for an access barring check operation. This may be agreed in advance. In this case, if the UE satisfies the specific skip condition for an access barring check operation, the UE may transmit a random access preamble to the (radio) network on a previously allocated random access preamble resource.

In another embodiment for solving the above-described problem, when a UE performs a process of performing registration or Attach or a procedure, such as tracking area update (TAU), a network may notify the UE of which access control mechanism/operation may be skipped in which case.

For example, there may be a (radio) network not having authorization information on a given UE. When the UE performs registration on the network, the network may previously designate that an access control mechanism/operation will be skipped in which case.

If this method is used, a burden of a radio network to determine whether the network will grant what UE to perform access using another radio access technology can be reduced. Specifically, the reason for this is that although a user has a UE supporting both NR and LTE, for example, if the user has actually made a contract for LTE only with a wireless communication service provider, the user should not use NR in access using the UE, and although an access control skip condition includes NR support, such a UE should not skip the access barring check operation. Accordingly, when the UE performs access in a cell, it may skip the application of a corresponding access control mechanism/operation with respect to conditions previously granted therefor from a network and only when the skip of the application is actually allowed in a cell.

In the above process, quality of a radio access service that may be provided by a cell to which a UE has accessed and quality of a radio access service that may be provided through a different cell other than a corresponding cell or a different radio access technology may be different. In this case, if quality of a radio access service that may be provided through a different cell or radio access technology is better, service providers may perform additional billing. If quality of a radio access service provided through a different cell or different radio access technology is lower, this may lead to a user's service quality dissatisfaction.

Particularly, this may lead to a user's dissatisfaction if a video call, for example, is provided through an unlicensed band, unlike in the case where service is provided through a licensed band. Accordingly, in such a case, although the skip of access control is allowed and access becomes easy, a UE should not actually attempt a connection or access.

Accordingly, in order to additionally solve such a problem, in the present invention, a network may additionally notify a UE of the following in the process of notifying the UE of information on whether the skip function of access control can be used.

Information regarding that a function capable of skipping which access control can be used when data to be transmitted occurs in an application Additionally, a network may notify a UE of characteristic information on the application, for example, an Internet protocol (IP) address, a port number, an app id, etc.

The following is one of exemplary operations of the present invention.

1. A UE selects a PLMN and starts a registration procedure (or Attach procedure). That is, the UE transmits a Registration Request message (or Attach Request message) to a network.

2. The network delivers, to the UE, information on the skip of access barring check operation during the registration procedure (or Attach procedure). For example, the following information may be delivered.

ACDC skip is allowed when the destination IP address of occurred data is CompanyX.com.

3. The UE enters an idle mode after the registration procedure (or Attach procedure).

4. It is assumed that a congestion has occurred in a cell on which the corresponding UE camps. It is assumed that the corresponding cell broadcasts that ACDC may be skipped through an SIB, if a UE supports ENDC using NR.

5. It is assumed that data corresponding to CompanyY. com having a destination IP address has occurred in the UE. The UE checks the destination IP of the data, and performs ACDC because the destination IP does not correspond to CompanyX.com.

6. If access is barred as a result of the execution of ACDC, the UE does not attempt access.

7. Thereafter, it is assumed that data has occurred in another application installed in the UE and the destination IP of the corresponding data is CompanyX.com. The UE checks the destination IP, confirms that the destination IP is companyX.com indicated in the previous registration procedure (or Attach procedure), and checks that ACDC skip has been allowed for the UE.

Furthermore, in the current cell, if ENDC using NR is supported, it has been broadcasted that ACDC skip may be performed. Accordingly, the UE additionally checks whether it supports ENDC using NR.

8. Thereafter, since the UE supports ENDC using NR, the UE skips an access control mechanism/operation using ACDC and attempts access to the network.

For example, in the above-described process, a service corresponding to CompanyY may be a service that is insensitive to delivery delay and that does not have a high data rate, like Internet chatting. In this case, it may not be necessary to perform a connection using NR rapidly.

In contrast, for example, in the above-described process, if a service corresponding to CompanyX is a service, such as virtual reality (VR), a fast service using NR is necessary. Furthermore, if the service is a call using VR, the service needs to be immediately connected. Accordingly, a service provider may grant the connection rapidly through a configuration, in this case, by skipping access barring check operation.

In the above description of the embodiment of the present invention, the description and examples have been listed based on EPS, but may be similarly applied to the 5G system (5GS).

Furthermore, in the above description of the embodiment of the present invention, the description and examples have been listed based on an RRC connection setup process, but a similar method may also be applied to RRC Connection Resume or an RRC message and procedure similar to that. In this case, an item related to an unlicensed band operation may be defined in an access category in a similar way, and may be defined as a category for selecting or mapping an access category.

Various embodiments according to the present invention may be independently performed, but one or more embodiments may be combined and used.

Figure 7:
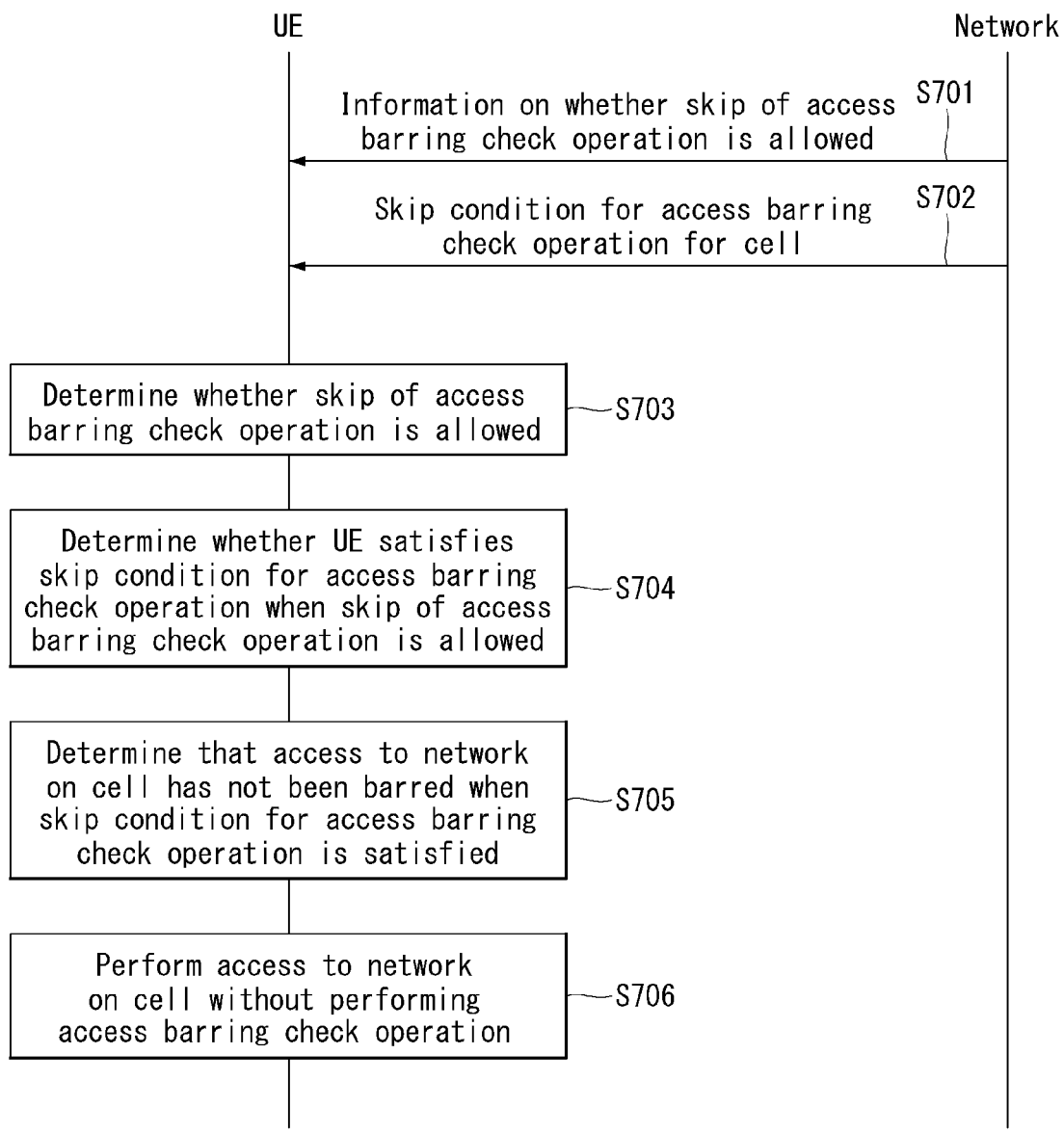
FIG. 7 is a diagram illustrating a method of accessing a network according to an embodiment of the present invention.

FIG. 7 is a diagram illustrating a method of accessing a network according to an embodiment of the present invention.

Referring to FIG. 7, a UE receives, from a network (e.g., mobility management entity (MME) or access and mobility management function (AMF)), information on whether the skip of a (specific) access barring check operation is allowed (S701).

In this case, the information on whether the skip of the (specific) access barring check operation is allowed may include information regarding that a function capable of skipping what access control may be used when data to be transmitted occurs in an application, for example. Furthermore, the information may include characteristic information on the application, for example, an Internet protocol (IP) address, a port number, an app id, etc.

The UE receives, from the (radio) network (e.g., base station), a skip condition for an access barring check operation for a cell supported by the corresponding (radio) network (S702).

In this case, the skip condition for an access barring check operation may include one or more of the support of ENDC, the support of MRDC, the support of LAA, the support of LWA or the support of NR. In this case, as described above, if a field for each condition is defined and the corresponding field is set as yes/skip or the corresponding field is present (e.g., within an SIB), this may mean that the corresponding condition has been activated (i.e., need to determine whether a UE satisfies the condition).

Furthermore, the skip condition for an access barring check operation may include one or more of the support of an additional different RAT, the support of a specific frequency, a specific radio technology combination (e.g., NR+EUTRA, NR+WLAN, EUTRA+WLAN), the support of NR or E-UTRA through an unlicensed band, or the support of a specific CA or DC (e.g., ENDC, MRDC). Likewise, if a field for each condition is defined and the corresponding field is set as yes/skip or the corresponding field is present (e.g., within an SIB), this may mean that the corresponding condition has been activated (i.e., need to determine whether a UE satisfies the condition).

In this case, one or more skip conditions for an access barring check operation may be configured for each cell. That is, when a (radio) network (e.g., base station) supports a plurality of cells, the skip condition for an access barring check operation may be different for each cell.

Furthermore, a plurality of access control operations, such as ACB, EAB, and ACDC, may be available (i.e., defined). In this case, one or more skip conditions for an access barring check operation may be configured for each access barring check operation. That is, the skip condition for an access barring check operation may be different for each access barring operation.

Furthermore, one or more skip conditions for an access barring check operation may be configured for each cell or for each access barring check operation. That is, when a (radio) network (e.g., base station) supports a plurality of cells, a different (or the same) access barring check operation may be available (i.e., defined) for each cell. Furthermore, a skip condition for an access barring check operation may be different for each access barring check operation.

In this case, the skip condition for an access barring check operation may be transmitted through an SIB.

In FIG. 7, step S701 and step S702 have been illustrated as being performed by a network, for convenience of description, but an entity (e.g., base station) performing step S701 and an entity (e.g., MME or AMF) performing step S702 may be different.

The UE determines whether the skip of a (specific) access barring check operation is allowed (S703).

In this case, as described above, the UE may determine whether the skip of the (specific) access barring check operation is allowed based on data to be transmitted by the UE.

If the skip of the (specific) access barring check operation is allowed, the UE determines whether it satisfies a skip condition for an access barring check operation (S704).

For example, if the skip condition for an access barring check operation includes one or more of the support of ENDC, the support of MRDC, the support of LAA, the support of LWA or the support of NR (or if a corresponding field is set as yes/skip), the UE determines whether it satisfies the corresponding one or more conditions (i.e., whether the UE supports ENDC/MRDC/LAA/LWA/NR).

Furthermore, if the skip condition for an access barring check operation includes one or more of the support of an additional different RAT, the support of a specific frequency, a specific radio technology combination (e.g., NR+EUTRA, NR+WLAN, EUTRA+WLAN), the support of NR or E-UTRA through an unlicensed band, or the support of a specific CA or DC (e.g., ENDC, MRDC) (or if a corresponding field is set as yes/skip), the UE determines whether the UE satisfies the corresponding one or more conditions.

When the skip condition for an access barring check operation is satisfied, the UE determines that access to the (radio) network on a cell (i.e., access to a base station/cell) has not been barred (S705).

In contrast, if the skip condition for an access barring check operation is not satisfied, the UE determines whether access to a cell has been barred by performing the above-described access operation on the (radio) network of the UE.

The UE performs access to the (radio) network on a cell (i.e., access to a base station/cell) without performing access barring check operation (S706).

In this case, as described above, the access barring check operation may include one or more of ACB, EAB or ACDC.

Meanwhile, today, a WLAN (so-called WIFI) operates in an unlicensed band. If a given criterion (e.g., if a technology that does not generate interference in a radio channel or minimizes interference is adopted and if given output power or less is used) is satisfied, any different radio technology other than the WLAN may be used in such an unlicensed band.

Accordingly, there is a movement to apply the technology now used in a cellular network to the unlicensed band, which is called licensed assisted access (LAA). The reason for this is that it is necessary for wireless communication service providers to secure an additional radio resource easily and cheaply as users who use mobile data are explosively increased compared to frequencies currently owned by wireless communication service providers. Accordingly, the 3GPP radio access technology is also applied to the unlicensed band in order to provide users with radio access opportunities through various conditions and options.

In this case, the service provider may take the following scenario into consideration.

use the cellular technology in a frequency allocated thereto (i.e., frequency managed by the service provider) and use a technology, such a WiFi, in the unlicensed band use the cellular technology in a frequency allocated thereto (i.e., frequency managed by the service provider) and use a technology, such as cellular, in the unlicensed band In either case, the service provider may use the two or more radio access technologies or may use radio frequency bands of different characteristics.

In this case, at the standpoint of the service provider, in the case of the frequency allocated thereto, a lot of money must be paid in order to obtain the frequency. In the unlicensed band, however, additional money is not paid in order for the frequency to be allocated. Accordingly, when wireless communication service is provided to customers, the application of billing when service is provided in a frequency allocated thereto (hereinafter referred to as a "licensed band" or "LB") and the application of billing when service is provided in a frequency not allocated thereto (hereinafter referred to as an "unlicensed band" or "UB") may be different.

Particularly, in a process using a mobile communication network, for example, in the case of voice service that is one of important services, if voice service is provided using a licensed band, a radio service provider may charge a user for a high fee based on the guarantee of quality of service (QoS) in the licensed band. In contrast, if the Voice service is provided using an unlicensed band or provided through the RAT not the 3GPP RAT, a low fee may be charged because QoS is low compared to the case where the licensed band is used.

However, a method of providing voice service using WiFi includes a method for a UE to access WiFi through an access point (AP) and then accessing an IMS. For example, in the case of service providers in some areas or if a licensed band and the 3GPP RAT are used within a house or within a building, radio quality is degraded or a shadow area occurs. In order for such service providers to provide voice service to their customers, a user placed in such a situation is granted to access the service providers using surrounding WiFi. In this case, since a corresponding AP is not an AP not directly installed by the wireless communication service provider, if the user accesses such an AP, there is a high danger that a voice call may be disconnected due to poor radio quality.

However, if a service provider provides a connection service to a user using its own licensed spectrum and an unlicensed/shared spectrum, it is necessary to handle the shortage phenomenon of radio resources. Particularly, if a radio resource congestion phenomenon occurs due to many users gathered at the licensed band, a network may reduce the radio resource congestion phenomenon by providing service to some users in the unlicensed spectrum.

However, in a conventional system, a UE first accesses an NR/LTE cell in a licensed band. Thereafter, the UE is provided with a connection service in an unlicensed band using a technology, such as LWA/LTE-WLAN radio level integration with IP security tunnel (LWIP)/LAA, if the technology is supported in the cell and if performance of the UE supports the technology. Due to such a method, there is a problem in that a fast connection is difficult when a UE not having a connection with a base station (eNB/gNB) newly establishes a connection due to congestion in a licensed band although there is a marginal radio resource in an unlicensed band.

Accordingly, in order to solve the above problem, the present invention proposes a method of controlling the congestion of radio resource complexly using a surrounding unlicensed spectrum if a cell of a radio network can additionally use the unlicensed spectrum.

Specifically, according to the present invention, a network may notify a UE that it can provide UEs with additional radio resources if the network can provide the additional radio resources using a surrounding unlicensed band.

In this case, the network may transmit, to the UE, a separate access control information/parameter applied to the UE that supports an operation in the unlicensed band.

The UE that has received the access control information may perform access control using the access control information if the UE supports an operation in the unlicensed band and if an access control parameter for an operation in the unlicensed band is transmitted in a current cell. In contrast, the UE may perform access control by applying a different access control parameter if the UE does not support an operation in the unlicensed band or an access control parameter for a UE supporting an operation in the unlicensed band is not transmitted in a current cell.

Hereinafter, an example of the operation is described.

A UE initiates the following procedure when a higher layer requests the establishment or resumption of an RRC connection while the UE is an RRC idle (RRC_IDLE).

When the UE initiates the procedure except narrow band-Internet of things (NB-IoT), the UE performs the followings:

1> If SystemInformationBlockType2 (SIB2) includes an AC barring list per PLMN (ac-BarringPerPLMN-List) and ac-BarringPerPLMN-List includes an AC barring per PLMN (AC-BarringPerPLMN) item having a PLMN identity index (plmn-IdentityIndex) corresponding to the PLMN selected by the higher layer:

2> The UE selects the AC-BarringPerPLMN item having plmn-IdentityIndex corresponding to the PLMN selected by the higher layer;

2> In the remainder of this procedure, the UE uses the selected AC-BarringPerPLMN item (i.e., presence or absence of an access barring parameter within the item) regardless of a common access barring parameter included in the SIB2;

1> Otherwise:

2> In the remainder of this procedure, the UE uses a common access barring parameter (i.e., presence or absence of these parameters) included in the SIB2;

1> If SystemInformationBlockType2 (SIB2) includes an ACDC barring list per PLMN (acdc-BarringPerPLMN-List) and acdc-BarringPerPLMN-List includes an ACDC barring per PLMN (ACDC-BarringPerPLMN) item having plmn-IdentityIndex corresponding to the PLMN selected by the higher layer:

2> The UE selects the ACDC-BarringPerPLMN item having plmn-IdentityIndex corresponding to the PLMN selected by the higher layer;

2> In the remainder of this procedure, the UE uses ACDC-BarringPerPLMN item (i.e., presence or absence of an access barring parameter within the item) selected for ACDC barring check regardless of common ACDC barring (acdc-BarringForCommon) included in the SIB2;

1> Otherwise:

2> In the remainder of this procedure, the UE uses acdc-BarringForCommon (i.e., presence or absence of these parameters) included in the SIB2 for ACDC barring check;

1> If the UE supports an unlicensed/shared spectrum-related operation (e.g., another standalone operation on LWA, LWIP, LAA, or unlicensed band):

2> If an SIB2 includes barring for an unlicensed band (BarringForUnlicensed);

2> Furthermore, if a higher layer indicates that such an RRC connection is for the setup of a bearer that may be delivered through an unlicensed spectrum:

3> The UE performs access barring check using BarringForUnlicensed;

4> If, as a result of the check, access has not been barred, the UE determines that a corresponding cell has not been barred in the remaining procedure;

1> If a higher layer indicates that the RRC connection is related to EAB:

2> If a result of the EAB check determines that the cell is barred:

3> When the procedure is terminated, the UE notifies the higher layer of a failure of the establishment of the RRC connection or a failure of the resumption of an RRC connection having suspend indication, and notifies the higher layer that EAB may be applied;

1> If a higher layer indicates that the RRC connection is related to ACDC, an SIB2 includes a barring category list per ACDC (BarringPerACDC-CategoryList), and ACDC for only an HPLMN (acdc-HPLMNonly) indicates that ACDC may be applied to the UE:

2> If BarringPerACDC-CategoryList includes a barring category per ACDC (BarringPerACDC-Category) item corresponding to an ACDC category selected by a higher layer:

3> The UE selects the BarringPerACDC-Category item corresponding to an ACDC category selected by a higher layer;

2> Otherwise:

3> The UE selects the last BarringPerACDC-Category item within BarringPerACDC-CategoryList;

2> The UE stops a timer T308 if it is running;

2> The UE performs access barring check using T308 as a barring timer (Tbarring) and using an ACDC barring configuration (acdc-BarringConfig) within BarringPerACDC-Category as an ACDC barring parameter;

2> If access to a cell is barred:

3> When the procedure is terminated, the UE notifies the higher layer of a failure of the establishment of the RRC connection or a failure of the resumption of an RRC connection having suspend indication, and notifies the higher layer that access barring may be applied due to ACDC;

1> Otherwise, if the UE is establishing an RRC connection for mobile terminating calls:

2> If a timer T302 is running:

3> When the procedure is terminated, the UE notifies the higher layer of a failure of the establishment of the RRC connection or a failure of the resumption of an RRC connection having suspend indication, and notifies the higher layer that access barring for mobile terminating calls may be applied;

1> Otherwise, if the UE is establishing an RRC connection for emergency calls:

2> If an SIB2 includes AC barring information (ac-BarringInfo):

3> If AC barring for emergency (ac-BarringForEmergency) is set as TRUE:

4> If the UE has one or more access classes having a value within a range 11~15 and the one or more access classes are valid for the UE to use them in accordance with 3GPP TS 22.011 and 3GPP TS 23.122, as stored in the USIM:

5> If ac-BarringInfo includes AC barring for mobile originated (MO) data (ac-BarringForMO-Data) and a corresponding bit within AC barring for special AC (ac-BarringForSpecialAC) included in ac-BarringForMO-Data is set to 1 with respect to all the access classes for the UE:

6> The UE determines that access to the cell has been barred;

4> Otherwise:

5> The UE determines that access to the cell has been barred;

2> If access to a cell has been barred:

3> When the procedure is terminated, the UE notifies the higher layer of a failure of the establishment of the RRC connection or a failure of the resumption of an RRC connection having suspend indication;

1> Otherwise, if the UE is establishing an RRC connection for a mobile originating call:

2> The UE performs access barring check using a timer T303 as a barring time (Tbarring) and using ac-BarringForMO-Data as an AC barring parameter, as specified in Paragraph 5.3.3.11 of 3GPP TS 36.331 같이;

2> If access to the cell is barred:

3> If SIB2 includes AC barring for circuit switched fallback (CSFB) (ac-BarringForCSFB) or the UE does not support CS fallback:

4> When the procedure is terminated, the UE notifies the higher layer of a failure of the establishment of the RRC connection or a failure of the resumption of an RRC connection having suspend indication, and notifies the higher layer that access barring for a mobile originating call may be applied;

3> Otherwise, (SIB2 does not include ac-BarringForCSFB and the UE supports CS fallback):

4> If a timer T306 is not running, the UE starts T306 as a timer value of T303;

4> When the procedure is terminated, the UE notifies the higher layer of a failure of the establishment of the RRC connection or a failure of the resumption of an RRC connection having suspend indication, and a higher layer that access barring for a mobile originating call and mobile originating CS fallback may be applied;

1> Otherwise, if the UE is establishing an RRC connection for mobile originating signalling:

2> The UE performs access barring check using a timer T305 as "Tbarring" and using AC barring for MO signaling (ac-BarringForMO-Signalling) as an AC barring parameter, as specified in Paragraph 5.3.3.11 of 3GPP TS 36.331;

2> If access to the cell is barred:

3> When the procedure is terminated, the UE notifies the higher layer of a failure of the establishment of the RRC connection or a failure of the resumption of an RRC connection having suspend indication, and notifies the higher layer that access barring for mobile originating signalling may be applied;

1> Otherwise, if the UE is establishing an RRC connection for mobile originating CS fallback:

2> If an SIB2 includes ac-BarringForCSFB:

3> The UE performs access barring check using the timer T306 as Tbarring and using ac-BarringForCSFB as an AC barring parameter, as specified in Paragraph 5.3.3.11 of 3GPP TS 36.331;

3> If access to the cell is barred:

4> When the procedure is terminated, the UE notifies the higher layer of a failure of the establishment of the RRC connection or a failure of the resumption of an RRC connection having suspend indication, and notifies the higher layer that access barring for mobile originating CS fallback may be applied due to ac-BarringForCSFB;

2> Otherwise:

3> The UE performs access barring check using the timer T306 as Tbarring and using ac-BarringForMO-Data as an access class barring parameter, as specified in Paragraph 5.3.3.11 of 3GPP TS 36.331;

3> If access to the cell is barred:

4> If a timer T303 is not running, the UE starts T303 as a timer value of T306;

4> When the procedure is terminated, the UE notifies the higher layer of a failure of the establishment of the RRC connection or a failure of the resumption of an RRC connection having suspend indication, and notifies the higher layer that mobile originating CS fallback and access barring for a mobile originating call and mobile originating CS fallback may be applied due to BarringForMO-Data;

1> Otherwise, if the UE is establishing an RRC connection for a mobile originating MMTEL voice, a mobile originating MMTEL video, a mobile originating SMSoIP or mobile originating SMS (mobile originating):

2> If the UE is establishing an RRC connection for a mobile originating MMTEL voice and an SIB2 includes an AC barring skip for an MMTEL voice (ac-BarringSkipForMMTELVoice); or 2> If the UE is establishing an RRC connection for a mobile originating MMTEL video and an SIB2 includes an AC barring skip for MMTEL video (ac-BarringSkipForMMTELVideo); or 2> If the UE is establishing an RRC connection for a mobile originating SMSoIP or mobile originating SMS (mobile originating) and an SIB2 includes an AC barring skip for SMS (ac-BarringSkipForSMS):

3> The UE determines that access to the cell is not barred;

2> Otherwise:

3> If an establishment cause (establishmentCause) received from a higher layer is set as mobile originating signalling (mo-Signalling) (including a case where mo-Signalling is substituted with high priority access (highPriorityAccess) according to 3GPP TS 24.301 or a case where mo-Signalling is substituted with a mobile originating voice call (mo-VoiceCall) according to Paragraph 5.3.3.3 of 3GPP TS 36.331):

4> The UE performs access barring check using a timer T305 as Tbarring and using ac-BarringForMO-Signalling as an AC barring parameter, as specified in Paragraph 5.3.3.11 of 3GPP TS 36.331;

4> If access to the cell is barred:

5> When the procedure is terminated the UE notifies the higher layer of a failure of the establishment of the RRC connection or a failure of the resumption of an RRC connection having suspend indication, and notifies the higher layer that access barring for mobile originating signalling may be applied;

3> If an establishment cause (establishmentCause) received from a higher layer is set as mobile originating data (mo-Data) (including a case where mo-Data is substituted with high priority access (highPriorityAccess) according to 3GPP TS 24.301 or a case where mo-Data is substituted with a mobile originating voice call (mo-VoiceCall) according to Paragraph 5.3.3.3 of 3GPP TS 36.331):

4> The UE performs access barring check using the timer T303 as Tbarring and using ac-BarringForMO-Data as an AC barring parameter, as specified in Paragraph 5.3.3.11 of 3GPP TS 36.331;

4> If access to the cell is barred:

5> If an SIB2 includes ac-BarringForCSFB and the UE does not support CS fallback:

6> When the procedure is terminated, the UE notifies the higher layer of a failure of the establishment of the RRC connection or a failure of the resumption of an RRC connection having suspend indication, and notifies the higher layer that access barring for a mobile originating call may be applied;

5> Otherwise (SIB2 does not include ac-BarringForCSFB and the UE supports CS fallback):

6> If the timer T306 is not running, the UE starts T306 as a timer value of T303;

6> When the procedure is terminated, the UE notifies the higher layer of a failure of the establishment of the RRC connection or a failure of the resumption of an RRC connection having suspend indication, and notifies the higher layer that access barring for a mobile originating call and mobile originating CS fallback may be applied;

1> If the UE is resuming the RRC connection:

2> The UE releases a master cell group (MCG) secondary cell (SCell)(s) if it has been configured in accordance with 3GPP TS 36.331 5.3.10.3a Paragraph;

2> The UE releases a power indication configuration (powerPrefIndicationConfig) if it has been configured, and stops a timer T340 if it is running;

2> The UE releases a proximity report configuration (reportProximityConfig) an deletes any associated proximity state reporting timer;

2> The UE releases a location acquisition configuration (obtainLocationConfig) if it has been configured;

2> The UE releases an in-device coexistence (IDC) configuration (idc-Config) if it has been configured;

2> The UE releases a primary cell (PCell) and releases a measurement subframe pattern (measSubframePatternPCell) if they have been configured;

2> The UE releases all secondary cell group (SCG) configurations other than a data radio bearer (DRB) configuration (configured by drb-ToAddModListSCG) if they have been configured;

2> The UE releases network-assisted interference cancellation and suppression (NAICS) information (naics-Info) for a PCell if it has been configured;

2> The UE releases an LWA configuration if it has been configured in accordance with 3GPP TS 36.331 5.6.14.3 Paragraph;

2> The UE releases an LWIP configuration if it has been configured in accordance with 3GPP TS 36.331 5.6.17.3 Paragraph;

2> The UE releases a bandwidth timer preference indication (bw-PreferenceIndicationTimer) if it has been configured, and stops a timer T341 if it is running.

2> The UE releases a delay budget reporting configuration (delayBudgetReportingConfig) if it has been configured, and stops a timer T342 if it is running;

1> The UE applies a basic physical channel configuration in accordance with 3GPP TS 36.331 9.2.4 Paragraph;

1> The UE applies a basic semi-persistent scheduling configuration in accordance with 3GPP TS 36.331 9.2.3 Paragraph;

1> The UE applies a basic MAC major configuration in accordance with 3GPP TS 36.331 9.2.2 Paragraph;

1> The UE applies a common control channel (CCCH) configuration in accordance with 3GPP TS 36.331 9.1.1.2 Paragraph;

1> The UE applies common timer time alignment (timeAlignmentTimerCommon) included in an SIB2;

1> The UE starts a timer T300;

1> If the UE is resuming the RRC connection:

2> The UE initiates the transmission of an RRC Connection Resume Request (RRCConnectionResumeRequest) message in accordance with 3GPP TS 5.3.3.3a;

1> Otherwise:

2> The UE discards access stratum (AS) context and a Resume identity (resumeIdentity) if they have been stored;

2> The UE initiates the transmission of an RRC Connection Request (RRCConnectionRequest) message in accordance with 3GPP TS 5.3.3.3;

In the case of NB-IoT, a UE performs the followings when it initiates this procedure:

1> If the UE is establishing or resuming an RRC connection for mobile originating other than data; or 1> If the UE is establishing or resuming an RRC connection for mobile originating data; or 1> If the UE is establishing or resuming an RRC connection for delay tolerant access; or 1> If the UE is establishing or resuming an RRC connection for mobile originating signalling;

2> The UE performs access barring check in accordance with 3GPP TS 36.331 5.3.3.14 Paragraph;

2> If access to a cell is barred:

3> When the procedure is terminated, the UE notifies the higher layer of a failure of the establishment of the RRC connection or a failure of the resumption of an RRC connection having suspend indication, and notifies the higher layer that access barring may be applied;

1> The UE applies a basic physical channel configuration in accordance with 3GPP TS 36.331 9.2.4 Paragraph;

1> The UE applies a basic MAC major configuration in accordance with 3GPP TS 36.331 9.2.2 Paragraph;

1> The UE applies a common control channel (CCCH) configuration in accordance with 3GPP TS 36.331 9.1.1.2 Paragraph;

1> The UE starts a timer T300;

1> If the UE is establishing an RRC connection:

2> The UE initiates the transmission of an RRC Connection Request (RRCConnectionRequest) message in accordance with 3GPP TS 5.3.3.3;

1> Otherwise, if the UE is resuming the RRC connection:

2> The UE initiates the transmission of an RRC Connection Resume Request (RRCConnectionResumeRequest) message in accordance with 3GPP TS 5.3.3.3a;

Table 7 is a table illustrating an SIB information element.

TABLE 7

```
-- ASN1START
SystemInfomationBlockType2 ::=   SEQUENCE {
    ac-BarringInfo                          SEQUENCE {
        ac-BarringForEmergency                  BOOLEAN,
        ac-BarringForMO-Signalling              AC-BarringConfig
OPTIONAL,             -- Need OP
        ac-BarringForMO-Data                    AC-BarringConfig
        OPTIONAL         -- Need OP
    }
                                            OPTIONAL,        -- Need
OP
    radioResourceConfigCommon               RadioResourceConfigCommonSIB,
    ue-TimersAndConstants                   UE-TimersAndConstants,
    freqInfo                                SEQUENCE {
        ul-CarrierFreq                          ARFCN-
ValueEUTRA                      OPTIONAL,    -- Need OP
        ul-Bandwidth                            ENUMERATED
{n6, n15, n25, n50, n75, n100}
                                            OPTIONAL,        -- Need
OP
        additionalSpectrumEmission          AdditionalSpectrumEmission
    },
    mbsfn-SubframeConfigList                MBSFN-SubframeConfigList
    OPTIONAL,         -- Need OR
    timeAlignmentTimerCommon                TimeAlignmentTimer,
    ...,
    lateNonCriticalExtension        OCTET    STRING     (CONTAINING
SystemInformationBlockType2-v8h0-IEs)
    OPTIONAL,
    [[  ssac-BarringForMMTEL-Voice-r9            AC-BarringConfig
    OPTIONAL,         -- Need OP
        ssac-BarringForMMTEL-Video-r9            AC-BarringConfig
    OPTIONAL          -- Need OP
    ]],
    [[  ac-BarringForCSFB-r10                    AC-BarringConfig
    OPTIONAL          -- Need OP
    ]],
    [[  ac-BarringSkipForMMTELVoice-r12          ENUMERATED {true}
    OPTIONAL,         -- Need OP
        ac-BarringSkipForMMTELVideo-r12          ENUMERATED {true}
    OPTIONAL,         -- Need OP
```

TABLE 7-continued

```
            ac-BarringSkipForSMS-r12                ENUMERATED {true}
OPTIONAL,            -- Need OP
            ac-BarringPerPLMN-List-r12              AC-BarringPerPLMN-List-r12
OPTIONAL             -- Need OP
    ]],
    [[  voiceServiceCauseIndication-r12            ENUMERATED {true}
OPTIONAL             -- Need OP
    ]],
    [[  acdc-BarringForCommon-r13                   ACDC-BarringForCommon-r13
OPTIONAL,            -- Need OP
            acdc-BarringPerPLMN-List-r13            ACDC-BarringPerPLMN-List-r13
OPTIONAL             -- Need OP
    ]],
    [[
        udt-RestrictingForCommon-r13                UDT-Restricting-r13
        OPTIONAL,            -- Need OR
        udt-RestrictingPerPLMN-List-r13             UDT-RestrictingPerPLMN-List-r13
OPTIONAL,            -- Need OR
        cIoT-EPS-OptimisationInfo-r13               CIOT-EPS-OptimisationInfo-r13
OPTIONAL,            -- Need OP
        useFullResumeID-r13                                         ENUMERATED
{true}                          OPTIONAL      -- Need OP
    ]],
    [[  unicastFreqHoppingInd-r13                   ENUMERATED {true}
        OPTIONAL             -- Need OP
    ]],
    [[  mbsfn-SubframeConfigList-v1430              MBSFN-SubframeConfigList-v1430
OPTIONAL,            -- Need OP
        videoServiceCauseIndication-r14             ENUMERATED {true}
        OPTIONAL             -- Need OP
    ]]
[[
        BarringForUnlicensed                                        AC-BarringConfig
        OPTIONAL      -- Need OP
]]
}
SystemInfomationBlockType2-v8h0-IEs ::=     SEQUENCE {
        multiBandInfoList                           SEQUENCE (SIZE (L..maxMultiBands)) OF
AdditionalSpectrumEmission OPTIONAL,        -- Need OR
        nonCriticalExtension                        SystemInfonnationBlockType2-v9e0-IEs
        OPTIONAL
}
SystemInfonnationBlockType2-v9e0-IEs ::= SEQUENCE {
        ul-CarrierFreq-v9e0                         ARFCN-ValueEUTRA-v9e0
        OPTIONAL,            -- Cond ul-FreqMax
        nonCriticalExtension                        SystemInformationBlockType2-v9i0-
IEs                            OPTIONAL
}
SystemInfomationBlockType2-v9i0-IEs ::= SEQUENCE {
-- Following field is only for late non-critical extensions for REL-9
        lateNonCriticalExtension                    OCTET STRING
            OPTIONAL,
-- Following field is only for late non-critical extensions from REL-10
        nonCriticalExtension                        SystemInformationBlockType2-v1010-IEs
            OPTIONAL
}
SystemInfomationBlockType2-v1010-IEs ::= SEQUENCE {
        freqInfo-v1010                              SEQUENCE {
            additionalSpectrumEmission-v1010
        AdditionalSpectrumEmission-v1010
        },
        multiBandInfoList-v1010                     SEQUENCE          (SIZE
(1..maxMultiBands)) OF AdditionalSpectrumEmission-v1010,
        nonCriticalExtension                        SEQUENCE { }
            OPTIONAL
}
AC-BarringConfig ::=                        SEQUENCE {
    ac-BarringFactor                                ENUMERATED {
        p00, p05, p10, p15, p20, p25, p30, p40,
        p50, p60, p70, p75, p80, p85, p90, p95},
    ac-BarringTime                                  ENUMERATED {s4, s8, s16,
s32, s64, s128, s256, s512},
    ac-BarringForSpecialAC                          BIT STRING (SIZE(5))
}
MBSFN-SubframeConfigList ::=        SEQUENCE (SIZE (1..maxMBSFN-Allocations))
OF MBSFN-SubframeConfig
MBSFN-SubframeConfigList-v1430 ::=          SEQUENCE   (SIZE   (1..maxMBSFN-
Allocations)) OF MBSFN-SubframeConfig-v1430
AC-BarringPerPLMN-List-r12 ::=      SEQUENCE (SIZE (1.. maxPLMN-r11)) OF AC-
BarringPerPLMN-r12
```

TABLE 7-continued

```
AC-BarringPerPLMN-r12 ::=          SEQUENCE {
    plmn-IdentityIndex-r12                    INTEGER   (L..maxPLMN-
r11),
    ac-BarringInfo-r12                        SEQUENCE {
        ac-BarringForEmergency-r12            BOOLEAN,
        ac-BarringForMO-Signalling-r12        AC-BarringConfig OPTIONAL,
-- Need OP
        ac-BarringForMO-Data-r12              AC-BarringConfig OPTIONAL
-- Need OP
    }
                                   OPTIONAL,     -- Need OP
    ac-BarringSkipForMMTELVoice-r12           ENUMERATED {true}
OPTIONAL,           -- Need OP
    ac-BarringSkipForMMTELVideo-r12           ENUMERATED {true}
OPTIONAL,           -- Need OP
    ac-BarringSkipForSMS-r12                  ENUMERATED {true}
OPTIONAL,           -- Need OP
    ac-BarringForCSFB-r12                     AC-BarringConfig
OPTIONAL,           -- Need OP
    ssac-BarringForMMTEL-Voice-r12            AC-BarringConfig          OPTIONAL,
-- Need OP
    ssac-BarringForMMTEL-Video-r12            AC-BarringConfig          OPTIONAL
-- Need OP
}
ACDC-BarringForCommon-r13::=       SEQUENCE {
    acdc-HPLMNonly-r13                        BOOLEAN,
    barringPerACDC-CategoryList-r13           BarringPerACDC-
CategoryList-r13
}
ACDC-BarringPerPLMN-List-r13 ::=   SEQUENCE (SIZE (1.. maxPLMN-r11)) OF
ACDC-BarringPerPLMN-r13
ACDC-BarringPerPLMN-r13 ::=        SEQUENCE {
    plmn-IdentityIndex-r13                    INTEGER (1..maxPLMN-r11),
    acdc-OnlyForHPLMN-r13                     BOOLEAN,
    barringPerACDC-CategoryList-r13           BarringPerACDC-
CategoryList-r13
}
BarringPerACDC-CategoryList-r13 ::= SEQUENCE (SIZE (1..maxACDC-Cat-r13)) OF
BarringPerACDC-Category-r13
BarringPerACDC-Category-r13 ::= SEQUENCE {
    acdc-Category-r13                         INTEGER (1..maxACDC-Cat-r13),
    acdc-BarringConfig-r13                    SEQUENCE {
        ac-BarringFactor-r13                      ENUMERATED {
    p00, p05, p10, p15, p20, p25, p30, p40,
    p50, p60, p70, p75, p80, p85, p90, p95},
        ac-BarringTime-r13                            ENUMERATED {s4, s8, s16,
s32, s64, S128, s256, s512}
    }
    OPTIONAL            -- Need OP
}
UDT-Restricting-r13       ::= SEQUENCE {
    udt-Restricting-r13                       ENUMERATED {true}
OPTIONAL, --Need OR
    udt-RestrictingTime-r13                   ENUMERATED {s4, s8, s16, s32, s64,
s128, s256, s512} OPTIONAL --Need OR
}
UDT-RestrictingPerPLMN-List-r13 ::=    SEQUENCE (SIZE (1..maxPLMN-r11)) OF UDT-
RestrictingPerPLMN-r13
UDT-RestrictingPerPLMN-r13 ::= SEQUENCE {
    plmn-IdentityIndex-r13                    INTEGER (1..maxPLMN-
r11),
    udt-Restricting-r13                       UDT-Restricting-r13
    OPTIONAL             --Need OR
}
CIOT-EPS-OptimisationInfo-r13 ::=   SEQUENCE (SIZE (1.. maxPLMN-r11)) OF CIOT-
OptimisationPLMN-r13
CIOT-OptimisationPLMN-r13::= SEQUENCE {
        up-CIoT-EPS-Optimisation-r13          ENUMERATED {true}
OPTIONAL,           -- Need OP
        cp-CIoT-EPS-Optimisation-r13          ENUMERATED {true}
OPTIONAL,           -- Need OP
        attachWithoutPDN-Connectivity-r13     ENUMERATED {true}
OPTIONAL            -- Need OP
}
-- ASN1STOP
```

Table 8 is a table describing field within the SIB information element.

TABLE 8

SystemInformationBlockType2 field descriptions ac-BarringFactor
when a given number derived by a UE is smaller than the value, access is granted. If not, access is barred. The value is interpreted within a range that is equal to or greater than 0 and smaller than 1.
p00 = 0, p05 = 0.05, p10 = 0.10,..., p95 = 0.95.
Values other than p00 may be set only when all bits corresponding to ac-BarringForSpecialAC are set to 0.
BarringForUnlicensed
Access barring for a UE supporting an unlicensed band operation
ac-BarringForCSFB
Access barring for mobile originating CS fallback
ac-BarringForEmergency
Access control barring for an access class 10
ac-BarringForMO-Data
Access control barring for mobile originating calls
ac-BarringForMO-Signalling
Access control barring for mobile originating signalling
ac-BarringForSpecialAC
Access control barring for access classes 11-15. The first/leftmost bit is for the access class 11, the second bit is for the access class 12, etc.
ac-BarringTime
Average access barring time value in seconds
acdc-BarringConfig
A barring configuration for an ACDC category. When a field is not present, access to a cell is determined to have not been barred for the ACDC category.
acdc-Category
Indicates an ACDC category.
acdc-OnlyForHPLMN
Indicates whether ACDC may be applied to a UE not located in a home PLMN (HPLMN) for a corresponding PLMN. TRUE indicates that ACDC may be applied to only a UE within an HPLMN for a corresponding PLMN. FALSE indicates that ACDC may be applied to all UEs within an HPLMN for a corresponding PLMN or UEs not located within the HPLMN.
additionalSpectrumEmission
AdditionalSpectrumEmission IE and related UE requirements are defined in 3GPP TS 36.101.
attachWithoutPDN-Connectivity
If present, this field indicates that Attach is supported in this PLMN without a packet data network (PDN) connection.
barringPerACDC-CategoryList
A barring information list for each ACDC category. The first item of this list corresponds to the highest ACDC category of an application in which an access attempt is limited to a minimum in which cell, the second item of the list corresponds to the ACDC category of the application limited to an application or more of the highest ACDC category within an access attempt in a cell, etc. The last item within the list corresponds to the lowest ACDC category of the application limited to a maximum within an access attempt in a cell.
cIoT-EPS-OptimisationInfo
A list of cellular IoT (CIoT) EPS-related parameters. A value 1 indicates a parameter for a PLMN first listed within the first plmn-IdentityList included in an SIB1. A value 2 indicates a parameter for a PLMN second listed within the same plmn-IdentityList or when a PLMN is no longer present in the same plmn-IdentityList, this value indicates a parameter for a PLMN first listed within a next plmn-IdentityList within the same SIB1.
cp-CIoT-EPS-Optimisation
This field indicates whether a UE is granted to establish a connection with control plane CIoT EPS optimization.
mbsfn-SubframeConfigList
Define a subframe reserved for a multicast broadcast single frequency network (MBSFN) within downlink.
multiBandInfoList
A list of additional spectrum emissions (AdditionalSpectrumEmission)
plmn-IdentityIndex
An index of a PLMN in a plmn-IdentityList field included in an SIB1.
A value 1 indicates a parameter for a PLMN first listed within the first plmn-IdentityList included in the SIB1. A value 2 indicates a parameter for a PLMN second listed within the same plmn-IdentityList or indicates a parameter for a PLMN first listed within next plmn- TABLE 8-continued SystemInformationBlockType2 field descriptions IdentityList within the same SIB1 when a PLMN is no longer present in the same plmn-IdentityList.
ssac-BarringForMMTEL-Video
Service-specific access class barring for MMTEL video originating call
ssac-BarringForMMTEL-Voice
Service-specific access class barring for MMTEL voice originating calls
udt-Restricting
A value TRUE indicates that a UE needs to indicate that unwanted data traffic should be restricted regardless of an RRC idle or an RRC connection state with respect to a higher layer. If the UE has one or more access classes having a value within a range 11~15 valid for the UE, the UE does not indicate this for a higher layer.
udt-RestrictingTime
If present and udt-Restricting is changed from TRUE, a UE drives the timer during the same time as rand * udt-RestrictingTime. In this case, ranb is a given number uniformly distributed within a range 0 ≤ rand < 1, and is a second unit. The timer is stopped when udt-Restricting changes to TRUE. When the timer expires, the UE indicates that the restriction has been reduced with respect to a higher layer.
unicastFreqHoppingInd
This field indicates whether a UE is granted to support frequency hopping for unicast MTC physical downlink control channel (MPDCCH)/physical downlink shared channel (PDSCH)/physical uplink shared channel (PUSCH).
ul-Bandwidth
The number of resource blocks within uplink, that is, a transmission bandwidth configuration parameter. An n6 value corresponds to 6 resource blocks, an n15 value corresponds to 15 resource blocks. In the case of FDD, if this parameter is not present, an uplink bandwidth is the same as a downlink bandwidth. In the case of TDD, if this parameter is not present, an uplink bandwidth is the same as a downlink bandwidth.
ul-CarrierFreq
In the case of FDD, if this parameter is not present, a value is determined from a basic TX-RX frequency classification defined in 3GPP TS 36.101. In the case of TDD, if this parameter is not present, it is the same as a downlink frequency.
up-CIoT-EPS-Optimisation
This field indicates whether a UE is granted to resume a connection with user plane CIoT EPS optimization.
useFullResumeID
This field indicates whether a UE indicates the entire Resume ID of 40 bits within an RRC Connection Resume request.
videoServiceCauseIndication
Indicate whether a UE is requested to use an establishment cause mo-VoiceCall for mobile originating MMTEL video call.
voiceServiceCauseIndication
Indicate whether a UE is requested to use an establishment cause mo-VoiceCall for mobile originating MMTEL voice call.

According to the above-described example, when data to be transmitted or data occurs in an application, a higher layer of a UE checks whether it is good to transmit the data of the application using an operation in the unlicensed band by checking QoS requirements or pre-configured policy information in the corresponding application. Furthermore, if this is possible, the higher layer of the UE notifies a lower layer (e.g., RRC layer) of this.

Thereafter, the lower layer checks a system information block 2 (SIB 2) transmitted in a corresponding cell and checks whether access control information for unlicensed band access is transmitted in the corresponding system information block 2. If the UE supports an operation in the unlicensed band, the UE checks whether it can perform access using the access control information for unlicensed band access. Furthermore, if the access is granted, the UE starts an RRC connection establishment procedure using RACH transmission.

Additionally, in the above process, a network or operator may deliver, to the UE, information on whether data may be transmitted through an operation in the unlicensed band with respect to each service configured in the UE. That is, if the network has information on QoS to be provided to each service and QoS that may be provided in each configuration, the network notifies the UE of such information in order to provide more stable and consistent service experiences. Accordingly, when data occurs in each application, a higher layer (e.g., NAS layer) checks whether an unlicensed operation may be used for each datum. Furthermore, if the unlicensed operation can be used, the higher layer may notify a lower layer whether to apply the unlicensed operation while transmitting an RRC connection request. The lower layer may check whether to transmit access control information for unlicensed band access and determine whether to apply the access control information based on the access control information transmitted by the base station.

Accordingly, when a congestion situation occurs in a cell of a licensed band and the cell supports an operation in an unlicensed band and if there is a margin of radio resources in the unlicensed band, the cell may first grant a UE, supporting an operation in the unlicensed band, to access thereto, may provide a data service to the UE through the unlicensed band, and may bar the access of a UE not supporting a relatively unlicensed band operation, thereby preventing a congestion situation in the licensed band from being degraded.

Similarly, QoS guarantee in an unlicensed band is more unstable than that in a licensed band. Furthermore, when low priority of an IoT UE is taken into consideration, although the low priority has been configured in relation to the IoT UE, if an unlicensed band is supported, normal priority or high priority can be applied. Similarly, in the same logic, if a normal UE supports an unlicensed band in addition to an IoT UE, it may skip access control itself.

Hereinafter, an example of such an operation is described.

A UE initiates the following procedure when a higher layer requests the establishment or resumption of an RRC connection while the UE is an RRC idle (RRC_IDLE).

When the procedure is initiated other than the NB-IoT, the UE performs the followings:

1> If SystemInformationBlockType2 (SIB2) includes AC barring list per PLMN (ac-BarringPerPLMN-List) and ac-BarringPerPLMN-List includes an AC barring per PLMN (AC-BarringPerPLMN) item having a PLMN identity index (plmn-IdentityIndex) corresponding to the PLMN selected by the higher layer:

2> The UE selects an AC-BarringPerPLMN item having plmn-IdentityIndex corresponding to the PLMN selected by the higher layer;

2> In the remainder of this procedure, the UE uses the selected AC-BarringPerPLMN item (i.e., presence or absence of an access barring parameter within the item) regardless of a common access barring parameter included in the SIB2;

1> Otherwise:

2> In the remainder of this procedure, the UE uses a common access barring parameter (i.e., presence or absence of these parameters) included in the SIB2;

1> If SystemInformationBlockType2 (SIB2) includes an ACDC barring list per PLMN (acdc-BarringPerPLMN-List) and acdc-BarringPerPLMN-List includes an ACDC barring per PLMN (ACDC-BarringPerPLMN) item having plmn-IdentityIndex corresponding to the PLMN selected by the higher layer:

2> The UE selects the ACDC-BarringPerPLMN item having plmn-IdentityIndex, corresponding to the PLMN selected by the higher layer;

2> In the remainder of this procedure, the UE uses the selected ACDC-BarringPerPLMN item (i.e., presence or absence of an access barring parameter within the item) for ACDC barring check regardless of common ACDC barring (acdc-BarringForCommon) included in the SIB2;

1> Else:

2> In the remainder of this procedure use the acdc-BarringForCommon (i.e. presence or absence of these parameters) included in SystemInformationBlockType2 for ACDC barring check;

2> If the UE supports an unlicensed/shared spectrum-related operation (e.g., another standalone operation on LWA, LWIP, LAA, or unlicensed band):

2> If the SIB2 indicates that a cell supports an unlicensed band operation;

2> Furthermore, if a higher layer indicates that the RRC connection is for the setup of a bearer that may be delivered through an unlicensed spectrum:

3> The UE determines whether the cell has not been barred in the remaining procedure.

1> If the higher layer indicates that the RRC connection is related to EAB:

2> If, a result of EAB check, it is determined that the cell is barred:

3> When the procedure is terminated, the UE notifies the higher layer of a failure of the establishment of the RRC connection or a failure of the resumption of an RRC connection having suspend indication, and notifies the higher layer that EAB may be applied;

1> If the higher layer indicates that the RRC connection is related to ACDC, the SIB2 includes a barring category list per ACDC (BarringPerACDC-CategoryList), and ACDC for only an HPLMN (acdc-HPLMNonly) indicates that ACDC may be applied to the UE:

2> When BarringPerACDC-CategoryList includes a barring category per ACDC (BarringPerACDC-Category) item corresponding to an ACDC category selected by the higher layer:

3> The UE selects the BarringPerACDC-Category item corresponding to the ACDC category selected by the higher layer;

2> Otherwise:

3> The UE selects the last BarringPerACDC-Category item within BarringPerACDC-CategoryList;

2> The UE stops a timer T308 if it is running;

2> The UE performs access barring check using T308 as a barring timer (Tbarring) and using an ACDC barring configuration (acdc-BarringConfig) within BarringPer-ACDC-Category as an ACDC barring parameter;

2> If access to the cell is barred:

3> When the procedure is terminated, the UE notifies the higher layer of a failure of the establishment of the RRC connection or a failure of the resumption of an RRC connection having suspend indication, and notifies the higher layer that access barring may be applied due to ACDC;

1> Otherwise, if the UE is establishing an RRC connection for mobile terminating calls:

2> If a timer T302 is running:

3> When the procedure is terminated, the UE notifies the higher layer of a failure of the establishment of the RRC connection or a failure of the resumption of an RRC connection having suspend indication, and notifies the higher layer that access barring for mobile terminating calls may be applied;

1> Otherwise, if the UE is establishing an RRC connection for emergency calls:

2> If an SIB2 includes AC barring information (ac-BarringInfo):

3> If AC barring for emergency (ac-BarringForEmergency) is set as TRUE:

4> If the UE has one or more access classes having a value within a range 11~15 and the one or more access classes are valid for the UE to use them in accordance with 3GPP TS 22.011 and 3GPP TS 23.122, as stored in the USIM:
5> If ac-BarringInfo includes AC barring for mobile originated (MO) data (ac-BarringForMO-Data), and a corresponding bit within AC barring for special AC (ac-BarringForSpecialAC) included in ac-BarringForMO-Data is set to 1 with respect to all the access classes for the UE:
6> The UE determines that access to the cell has been barred;
4> Otherwise:
5> The UE determines that access to the cell has been barred;
2> If access to the cell has been barred:
3> When the procedure is terminated, the UE notifies the higher layer of a failure of the establishment of the RRC connection or a failure of the resumption of an RRC connection having suspend indication;
1> Otherwise, if the UE is establishing an RRC connection for a mobile originating call:
2> The UE performs access barring check using a timer T303 as a barring time (Marring) and using ac-BarringForMO-Data using an AC barring parameter, as specified in Paragraph 5.3.3.11 of 3GPP TS 36.331;
2> If access to the cell is barred:
3> If an SIB2 includes AC barring for circuit switched fall back (CSFB) (ac-BarringForCSFB) or the UE does not support CS fallback:
4> When the procedure is terminated, the UE notifies the higher layer of a failure of the establishment of the RRC connection or a failure of the resumption of an RRC connection having suspend indication, and notifies the higher layer that access barring for a mobile originating call may be applied;
3> Otherwise (SIB2 does not include ac-BarringForCSFB and the UE supports CS fallback):
4> If the timer T306 is not running, the UE starts T306 as a timer value of T303;
4> When the procedure is terminated, the UE notifies the higher layer of a failure of the establishment of the RRC connection or a failure of the resumption of an RRC connection having suspend indication, and notifies the higher layer that access barring for a mobile originating call and mobile originating CS fallback may be applied;
1> Otherwise, if the UE is establishing an RRC connection for mobile originating signalling:
2> The UE performs access barring check using a timer T305 as "Tbarring" and using AC barring for MO signaling (ac-BarringForMO-Signalling) as an AC barring parameter, as specified in Paragraph 5.3.3.11 of 3GPP TS 36.331;
2> If access to the cell is barred:
3> When the procedure is terminated, the UE notifies the higher layer of a failure of the establishment of the RRC connection or a failure of the resumption of an RRC connection having suspend indication, and notifies the higher layer that access barring for mobile originating signalling may be applied;
1> Otherwise, if the UE is establishing an RRC connection for mobile originating CS fallback:
2> If an SIB2 includes ac-BarringForCSFB:
3> The UE performs access barring check using a timer T306 as Tbarring and using ac-BarringForCSFB as an AC barring parameter, as specified in Paragraph 5.3.3.11 of 3GPP TS 36.331;
3> If access to the cell is barred:
4> When the procedure is terminated, the UE notifies the higher layer of a failure of the establishment of the RRC connection or a failure of the resumption of an RRC connection having suspend indication, and notifies the higher layer that access barring for mobile originating CS fallback may be applied due to ac-BarringForCSFB;
2> Otherwise:
3> The UE performs access barring check using the timer T306 as Tbarring and using ac-BarringForMO-Data as an access class barring parameter, as specified in Paragraph 5.3.3.11 of 3GPP TS 36.331;
3> If access to the cell is barred:
4> If the timer T303 is not running, the UE starts T303 as a timer value of T306;
4> When the procedure is terminated, the UE notifies the higher layer of a failure of the establishment of the RRC connection or a failure of the resumption of an RRC connection having suspend indication, and notifies the higher layer that mobile originating CS fallback and access barring for a mobile originating call and mobile originating CS fallback may be applied due to BarringForMO-Data;
1> Otherwise, if the UE is establishing an RRC connection for a mobile originating MMTEL voice, a mobile originating MMTEL video, a mobile originating SMSoIP or mobile originating SMS (mobile originating):
2> If the UE is establishing an RRC connection for a mobile originating MMTEL voice and the SIB2 includes AC barring skip for an MMTEL voice (ac-BarringSkipForMMTELVoice); or
2> If the UE is establishing an RRC connection for a mobile originating MMTEL video and the SIB2 includes AC barring skip for MMTEL video (ac-BarringSkipForMMTELVideo); or
2> If the UE is establishing an RRC connection for a mobile originating SMSoIP or mobile originating SMS (mobile originating) and the SIB2 includes AC barring skip for SMS (ac-BarringSkipForSMS):
3> The UE determines that access to the cell is not barred;
2> Otherwise:
3> If an establishment cause (establishmentCause) received from a higher layer is set as mobile originating signaling (mo-Signalling) (including a case where mo-Signalling is substituted with high priority access (highPriorityAccess) according to 3GPP TS 24.301 or a case where mo-Signalling is substituted with a mobile originating voice call (mo-VoiceCall) according to Paragraph 5.3.3.3 of 3GPP TS 36.331):
4> The UE performs access barring check using a timer T305 as Tbarring and using ac-BarringForMO-Signalling as an AC barring parameter, as specified in Paragraph 5.3.3.11 of 3GPP TS 36.331;
4> If access to the cell is barred:
5> When the procedure is terminated, the UE notifies the higher layer of a failure of the establishment of the RRC connection or a failure of the resumption of an RRC connection having suspend indication, and notifies the higher layer that access barring for mobile originating signalling may be applied;
3> If an establishment cause (establishmentCause) received from a higher layer is set as mobile originating data (mo-Data) (including a case where mo-Data is substituted with high priority access (highPriorityAccess) according to 3GPP TS 24.301 or a case where mo-Data is substituted with a mobile originating voice call (mo-VoiceCall) according to Paragraph 5.3.3.3 of 3GPP TS 36.331):

4> The UE performs access barring check using a timer T303 as Tbarring and using ac-BarringForMO-Data as an AC barring parameter, as specified in Paragraph 5.3.3.11 of 3GPP TS 36.331;
    4> If access to the cell is barred:
        5> If am SIB2 includes ac-BarringForCSFB and the UE does not support CS fallback:
            6> When the procedure is terminated, the UE notifies the higher layer of a failure of the establishment of the RRC connection or a failure of the resumption of an RRC connection having suspend indication, and notifies the higher layer that access barring for a mobile originating call may be applied;
        5> Otherwise (SIB2 does not include ac-BarringForCSFB and the UE supports CS fallback):
            6> If the timer T306 is not running, the UE starts T306 as a timer value of T303;
            6> When the procedure is terminated, the UE notifies the higher layer of a failure of the establishment of the RRC connection or a failure of the resumption of an RRC connection having suspend indication, and notifies the higher layer that access barring for a mobile originating call and mobile originating CS fallback may be applied;
1> If the UE is resuming the RRC connection:
    2> The UE releases a master cell group (MCG) secondary cell (SCell)(s) in accordance with 3GPP TS 36.331 5.3.10.3a Paragraph, if it has been configured;
    2> The UE releases a power indication configuration (powerPrefIndicationConfig) if it has been configured, and stops a timer T340 if it is running;
    2> The UE releases a proximity report configuration (reportProximityConfig) and deletes any associated proximity state reporting timer;
    2> The UE releases a location acquisition configuration (obtainLocationConfig) if it has been configured;
    2> The UE releases an in-device coexistence (IDC) configuration (idc-Config) if it has been configured;
    2> The UE releases a primary cell (PCell) if it has been configured, and the UE releases a measurement subframe pattern (measSubframePatternPCell);
    2> The UE releases all secondary cell group (SCG) configurations other than a data radio bearer (DRB) configuration (configured by drb-ToAddModListSCG) if it has been configured;
    2> The UE releases network-assisted interference cancellation and suppression (NAICS) information (naics-Info) for a PCell if it has been configured;
    2> The UE releases an LWA configuration in accordance with 3GPP TS 36.331 5.6.14.3 Paragraph if it has been configured;
    2> The UE releases an LWIP configuration in accordance with 3GPP TS 36.331 5.6.17.3 Paragraph if it has been configured;
    2> Bandwidth timer preference indication (bw-PreferenceIndicationTimer) is released if it has been configured, and a timer T341 is stopped if it is running;
    2> A delay budget reporting configuration (delayBudgetReportingConfig) is released if it has been configured, and a timer T342 is stopped if it is running;
1> The UE applies a basic physical channel configuration in accordance with 3GPP TS 36.331 9.2.4 Paragraph;
1> The UE applies a basic semi-persistent scheduling configuration in accordance with 3GPP TS 36.331 9.2.3 Paragraph;
1> The UE applies a basic MAC major configuration in accordance with 3GPP TS 36.331 9.2.2 Paragraph;
1> The UE applies a common control channel (CCCH) configuration in accordance with 3GPP TS 36.331 9.1.1.2 Paragraph;
1> The UE applies common timer time alignment (time-AlignmentTimerCommon) included in the SIB2;
1> The UE starts a timer T300;
1> If the UE is resuming the RRC connection:
    2> The UE initiates the transmission of an RRC Connection Resume request (RRCConnectionResumeRequest) message in accordance with 3GPP TS 5.3.3.3a;
1> Otherwise:
    2> The UE discards an access stratum (AS) context and Resume identifier (resumeIdentity) if it has been stored;
    2> The UE initiates the transmission of an RRC connection request (RRCConnectionRequest) message in accordance with 3GPP TS 5.3.3.3;

In the case of the NB-IoT, when the procedure is initiated, a UE performs the followings:
1> If the UE is establishing or resuming an RRC connection for mobile originating other than data; or
1> If the UE is establishing or resuming an RRC connection for mobile originating data; or
1> If the UE is establishing or resuming an RRC connection for delay tolerant access; or
1> If the UE is establishing or resuming an RRC connection for mobile originating signalling;
    2> The UE performs access barring check in accordance with 3GPP TS 36.331 5.3.3.14 Paragraph;
    2> If access to a cell is barred:
        3> When the procedure is terminated, the UE notifies a higher layer of a failure of the establishment of the RRC connection or a failure of the resumption of an RRC connection having suspend indication, and notifies the higher layer that access barring may be applied;
1> The UE applies a basic physical channel configuration in accordance with 3GPP TS 36.331 9.2.4 Paragraph;
1> The UE applies a basic MAC major configuration in accordance with 3GPP TS 36.331 9.2.2 Paragraph;
1> The UE applies a common control channel (CCCH) configuration in accordance with 3GPP TS 36.331 9.1.1.2 Paragraph;
1> The UE starts a timer T300;
1> If the UE is establishing an RRC connection:
    2> The UE initiates the transmission of an RRC connection request (RRCConnectionRequest) message in accordance with 3GPP TS 5.3.3.3;
1> Otherwise, if the UE is resuming the RRC connection:
    2> The UE initiates the transmission of an RRC Connection Resume request (RRCConnectionResumeRequest) message in accordance with 3GPP TS 5.3.3.3a;

Meanwhile, in the description of the embodiments of the present invention, the RRC connection setup process has been chiefly illustrated, but the present invention is not limited thereto and may be similarly applied to an RRC Connection Resume process.

Furthermore, in the description of the embodiments of the present invention, the EPS has been chiefly described, but a similar method may also be applied to a 5GS. In this case, an item related to an unlicensed band operation may be added to an access category in a similar manner or may be added as a category in which an access category may be selected or mapped.

General Apparatus to which the Present Invention May be Applied

Figure 8:
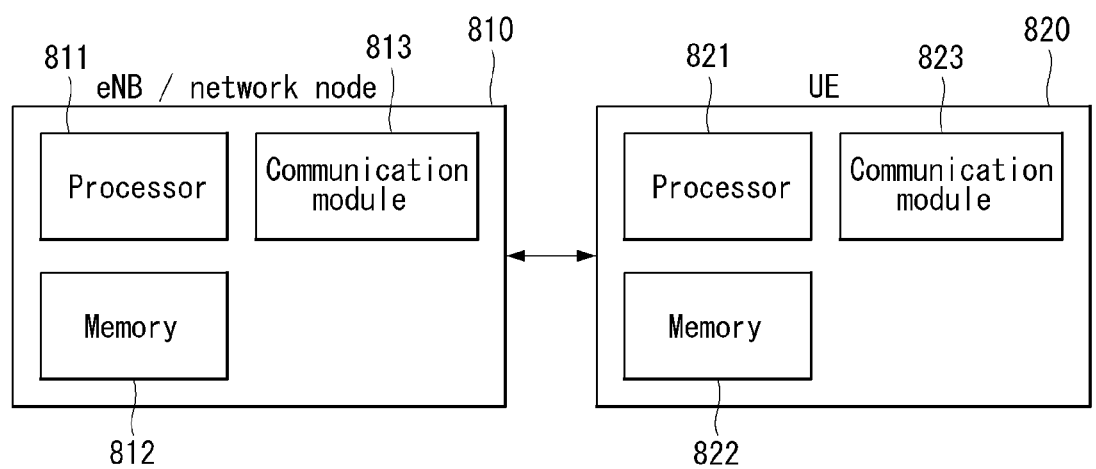
FIG. 8 illustrates a block diagram of a communication apparatus according to an embodiment of the present invention.

FIG. 8 illustrates a block diagram of a communication apparatus according to an embodiment of the present invention.

Referring to FIG. 8, the wireless communication system includes a network node 810 and multiple UEs 820.

The network node 810 includes a processor 811, memory 912 and a transceiver 813. The processor 811 implements the functions, processes and/or methods proposed in FIGS. 1 to 7. The layers of a wired/wireless interface protocol may be implemented by the processor 811.

The memory 812 is connected to the processor 811 and stores various types of information for driving the processor 811. The transceiver 813 is connected to the processor 811 and transmits and/or receives a wired/wireless signal. An example of the network node 810 may correspond to a base station (eNB, ng-eNB and/or gNB), an MME, an AMF, an SMF, an HSS, an SGW, a PGW, an SCEF, an SCS/AS, etc. Particularly, if the network node 810 is a base station (eNB, ng-eNB and/or gNB), the transceiver 813 may include a radio frequency (RF) unit for transmitting and receiving radio signals.

The UE 820 includes a processor 821, memory 822 and a transceiver (or RF unit) 823. The processor 821 implements the functions, processes and/or methods proposed in FIGS. 1 to 7. The layers of a radio interface protocol may be implemented by the processor 821. Specifically, the processor may include an NAS layer and an AS layer. The memory 822 is connected to the processor 821 and stores various types of information for driving the processor 821. The transceiver 823 is connected to the processor 821 and transmits and/or receives a radio signal.

The memory 812, 822 may be positioned inside or outside the processor 811, 821 and may be connected to the processor 811, 821 by various well-known means. Furthermore, the network node 810 (in the case of a base station) and/or the UE 820 may have a single antenna or multiple antennas.

The processor 821 of the UE receives a skip condition for an access barring check operation for a cell supported by a corresponding (radio) network from the (radio) network (e.g., base station) through the transceiver (or RF unit) 823.

In this case, the skip condition for an access barring check operation may include one or more of the support of ENDC, the support of MRDC, the support of LAA, the support of LWA or the support of NR. In this case, as described above, if a field for each condition is defined and the corresponding field is set as yes/skip or the corresponding field is present (e.g., within an SIB), this may mean that the corresponding condition has been activated (i.e., need to determine whether a UE satisfies the condition).

Furthermore, the skip condition for an access barring check operation may include one or more of the support of an additional different RAT, the support of a specific frequency, a specific radio technology combination (e.g., NR+EUTRA, NR+WLAN, EUTRA+WLAN), the support of NR or E-UTRA through an unlicensed band, or the support of a specific CA or DC (e.g., ENDC, MRDC). Likewise, if a field for each condition is defined and the corresponding field is set as yes/skip or the corresponding field is present (e.g., within an SIB), this may mean that the corresponding condition has been activated (i.e., need to determine whether a UE satisfies the condition).

In this case, one or more skip conditions for an access barring check operation may be configured for each cell. That is, when a (radio) network (e.g., base station) supports a plurality of cells, the skip condition for an access barring check operation may be different for each cell.

Furthermore, a plurality of access control operations, such as ACB, EAB, and ACDC, may be available (i.e., defined). In this case, one or more skip conditions for an access barring check operation may be configured for each access barring check operation. That is, the skip condition for an access barring check operation may be different for each access barring check operation.

Furthermore, one or more skip conditions for an access barring check operation may be configured for each cell or for each access barring check operation. That is, when a (radio) network (e.g., base station) supports a plurality of cells, a different (or the same) access barring check operation may be available (i.e., defined) for each cell. Furthermore, the skip condition for an access barring check operation may be different for each access barring check operation.

In this case, the skip condition for an access barring check operation may be transmitted through an SIB.

The processor 821 of the UE determines whether the UE satisfies a skip condition for an access barring check operation.

For example, if a skip condition for an access barring check operation includes one or more of the support of ENDC, the support of MRDC, the support of LAA, the support of LWA or the support of NR (or if a corresponding field is set as yes/skip), the processor 821 of the UE determines whether the UE satisfies the corresponding one or more conditions (i.e., if the UE supports ENDC/MRDC/LAA/LWA/NR).

Furthermore, if a skip condition for an access barring check operation includes one or more of the support of an additional different RAT, the support of a specific frequency, a specific radio technology combination (e.g., NR+EUTRA, NR+WLAN, EUTRA+WLAN), the support of NR or E-UTRA through an unlicensed band, or the support of a specific CA or DC (e.g., ENDC, MRDC) (or if a corresponding field is set as yes/skip), the processor 821 of the UE determines whether the UE satisfies the corresponding one or more conditions.

When a skip condition for an access barring check operation is satisfied, the processor 821 of the UE determines that access to a (radio) network on a cell (i.e., access to a base station/cell) has not been barred.

In contrast, if the skip condition for an access barring check operation is not satisfied, the processor 821 of the UE determines whether access to a cell has been barred by performing the access operation of the UE on the (radio) network.

The processor 821 of the UE performs access to a (radio) network on a cell (i.e., access to a base station/cell) without performing an access barring check operation.

In this case, as described above, the access barring check operation may include one or more of ACB, EAB or ACDC.

Figure 9:
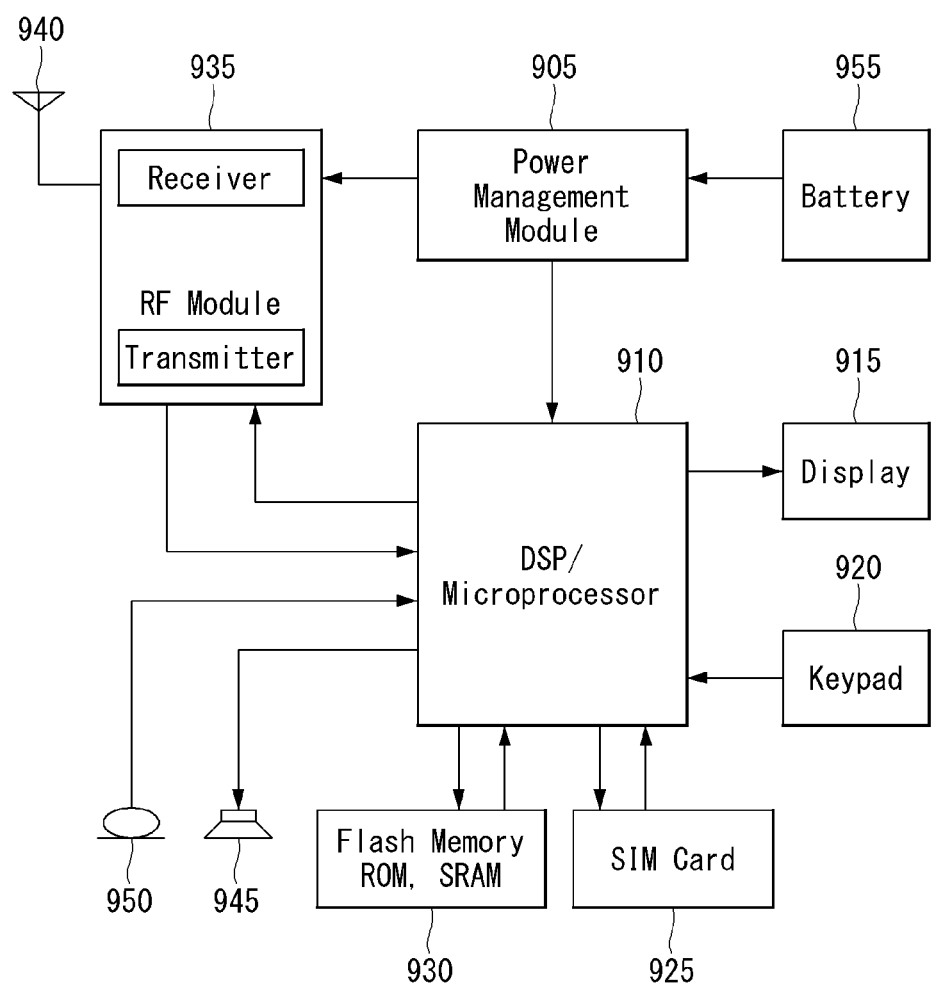
FIG. 9 illustrates a block diagram of a communication apparatus according to an embodiment of the present invention.

FIG. 9 illustrates a block diagram of a communication apparatus according to an embodiment of the present invention.

Specifically, FIG. 9 is a diagram illustrating the UE of FIG. 8 more specifically.

Referring to FIG. 9, the UE may include a processor (or digital signal processor (DSP)) 910, an RF module (or RF unit) 935, a power management module 905, an antenna 940, a battery 955, a display 915, a keypad 920, a memory 930, a subscriber identification module (SIM) card 925 (this element is optional), a speaker 945, and a microphone 950. The UE may further include a single antenna or multiple antennas.

The processor 910 implements the function, process and/or method proposed in FIGS. 1 to 7. The layers of a radio interface protocol may be implemented by the processor 910.

The memory 930 is connected to the processor 910, and stores information related to the operation of the processor 910. The memory 930 may be positioned inside or outside the processor 910 and may be connected to the processor 910 by various well-known means.

A user inputs command information, such as a telephone number, by pressing (or touching) a button of the keypad 920 or through voice activation using the microphone 950, for example. The processor 910 receives such command information and performs processing so that a proper function, such as making a phone call to the telephone number, is performed. Operational data may be extracted from the SIM card 925 or the memory 930. Furthermore, the processor 910 may recognize and display command information or driving information on the display 915, for convenience sake.

The RF module 935 is connected to the processor 910 and transmits and/or receives RF signals. The processor 910 delivers command information to the RF module 935 so that the RF module 935 transmits a radio signal that forms voice communication data, for example, in order to initiate communication. The RF module 935 includes a receiver and a transmitter in order to receive and transmit radio signals. The antenna 940 functions to transmit and receive radio signals. When a radio signal is received, the RF module 935 delivers the radio signal so that it is processed by the processor 910, and may convert the signal into a baseband. The processed signal may be converted into audible or readable information output through the speaker 945

The aforementioned embodiments have been achieved by combining the elements and characteristics of the present invention in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention.

INDUSTRIAL APPLICABILITY

The present invention has been illustrated based on an example in which it is applied to a 3GPP LTE/LTE-A system, but may be applied to various wireless communication systems, specifically, a 5 generation (5G) system in addition to the 3GPP LTE/LTE-A system.

The invention claimed is:

1. A method of accessing, by a user equipment (UE), a network in a wireless communication system, the method comprising:
   receiving, from the network, a skip condition for an access barring check operation for a cell supported by the network;
   determining whether the UE satisfies the skip condition for the access barring check operation;
   determining that access to the network on the cell has not been barred based on the skip condition for the access barring check operation being satisfied; and
   performing the access to the network on the cell without performing the access barring check operation,
   wherein the skip condition for the access barring check operation comprises one or more of a support of E-UTRA-NR dual connectivity (ENDC), a support of multi-RAT dual connectivity (MRDC), a support of licensed assisted access (LAA), a support of an LTE-WLAN aggregation (LWA), or a support of a new RAT (NR), and
   wherein the skip condition for the access barring check operation further comprises frequency information to which the skip condition for the access barring check operation is applied.

2. The method of claim 1,
   wherein the access barring check operation comprises one or more of access control barring (ACB), extended access barring (EAB), or application specific congestion control for data communication (ACDC).

3. The method of claim 2,
   wherein based on a plurality of the access barring check operations being used, a skip condition for the access barring check operation is transmitted for each access barring check operation.

4. The method of claim 1,
   wherein a radio resource control (RRC) message transmitted to perform the access to the network comprises information on an access barring check operation skipped by the UE and/or information on a skip condition for an access barring check operation satisfied by the UE.

5. The method of claim 1,
   wherein a random access preamble resource for performing the access to the network is allocated to a UE satisfying a skip condition for a specific access barring check operation.

6. The method of claim 5,
   wherein based on the UE satisfying the skip condition for the specific access barring check operation, the UE transmits, on the allocated random access preamble resource, a random access preamble for performing the access to the network.

7. The method of claim 1, further comprising:
receiving, from the network, information on whether the skip of the access barring check operation is allowed.

8. The method of claim 7,
wherein the information on whether the skip of the access barring check operation is allowed indicates that a skip of what access barring check operation is allowed based on data to be transmitted by the UE.

9. The method of claim 8,
wherein based on the skip of the access barring check operation being allowed based on the data to be transmitted by the UE, whether the UE satisfies the skip condition for the access barring check operation is determined.

10. A user equipment (UE) configured to perform access to a network in a wireless communication system, the UE comprising:
a transceiver configured to transmit and receive radio signals; and
at least one processor configured to control the transceiver,
wherein the at least one processor is configured to:
receive, from the network, a skip condition for an access barring check operation for a cell supported by the network,
determine whether the UE satisfies the skip condition for the access barring check operation,
determine that access to the network on the cell has not been barred based on the skip condition for the access barring check operation being satisfied, and
perform the access to the network on the cell without performing the access barring check operation,
wherein the skip condition for the access barring check operation comprises one or more of a support of E-UTRA-NR dual connectivity (ENDC), a support of multi-RAT dual connectivity (MRDC), a support of licensed assisted access (LAA), a support of an LTE-WLAN aggregation (LWA) or a support of a new RAT (NR), and
wherein the skip condition for the access barring check operation further comprises frequency information to which the skip condition for the access barring check operation is applied.

* * * * *